US012799756B2

(12) United States Patent
Barton et al.

(10) Patent No.: US 12,799,756 B2
(45) **Date of Patent: *Nov. 17, 2026**

(54) HOT TUB FILTERWELL DISPERSANT TECHNOLOGY

(71) Applicant: King Technology, Inc., Minnetonka, MN (US)

(72) Inventors: Eric J. Barton, Eden Prairie, MN (US); Jeffrey D. Johnson, Edina, MN (US); Darrin M. Swagel, Minnetonka, MN (US)

(73) Assignee: King Technology, Inc., Minnetonka, MN (US)

( * ) Notice: Subject to any disclaimer, the term of this patent is extended or adjusted under 35 U.S.C. 154(b) by 357 days.

This patent is subject to a terminal disclaimer.

(21) Appl. No.: 18/460,181

(22) Filed: Sep. 1, 2023

(65) Prior Publication Data

US 2024/0175278 A1 May 30, 2024

Related U.S. Application Data

(63) Continuation-in-part of application No. 18/116,615, filed on Mar. 2, 2023.

(60) Provisional application No. 63/372,328, filed on Mar. 3, 2022.

(51) Int. Cl.
*E04H 4/12* (2006.01)
*B01D 27/08* (2006.01)

(52) U.S. Cl.
CPC ........... *E04H 4/1209* (2013.01); *B01D 27/08* (2013.01); *B01D 2201/29* (2013.01); *B01D 2201/32* (2013.01)

(58) Field of Classification Search
CPC .. E04H 4/1209; B01D 27/08; B01D 2201/29; B01D 2201/32; B01D 37/025
See application file for complete search history.

(56) References Cited

U.S. PATENT DOCUMENTS

| | | | |
|---|---|---|---|
| 4,842,729 | A | 6/1989 | Buchan |
| 7,059,540 | B2 | 6/2006 | King et al. |
| 7,060,190 | B2 | 6/2006 | King et al. |
| 7,487,790 | B2 | 2/2009 | King et al. |
| 8,617,481 | B1 | 12/2013 | Snetting et al. |
| 2005/0211613 | A1 | 9/2005 | King |
| 2010/0163470 | A1 | 7/2010 | Oranski et al. |
| 2013/0098820 | A1 | 4/2013 | King et al. |
| 2019/0048604 | A1 | 2/2019 | Guy et al. |
| 2020/0216341 | A1 | 7/2020 | Guy et al. |
| 2021/0199136 | A1 | 7/2021 | Tulett et al. |

(Continued)

FOREIGN PATENT DOCUMENTS

| | | | |
|---|---|---|---|
| EP | 1428799 | A2 | 6/2004 |
| WO | 2023167988 | A2 | 9/2023 |

OTHER PUBLICATIONS

International Searching Authority, "International Search Report and Written Opinion" From Application No. PCT/US2023/014359, mailed Aug. 16, 2023, pp. 17.

(Continued)

*Primary Examiner* — Hayden Brewster
(74) *Attorney, Agent, or Firm* — Fredrikson & Byron, P.A.

(57) ABSTRACT

In some embodiments, the invention provides an apparatus configured to deliver dispersant into the water in a filterwell of a hot tub. Methods for delivering dispersant into the water in a filterwell of a hot tub are also provided.

20 Claims, 16 Drawing Sheets

(56) References Cited

U.S. PATENT DOCUMENTS

2021/0270053 A1 9/2021 Brennan

OTHER PUBLICATIONS

International Searching Authority, "International Search Report and Written Opinion" From Application No. PCT/US2024/044734, Mailed Dec 10, 2024, pp. 19.

European Patent Office, "Extended European Search Report" , From Application No. 23763926.5, Dated Jan. 29, 2026, pp. 12.

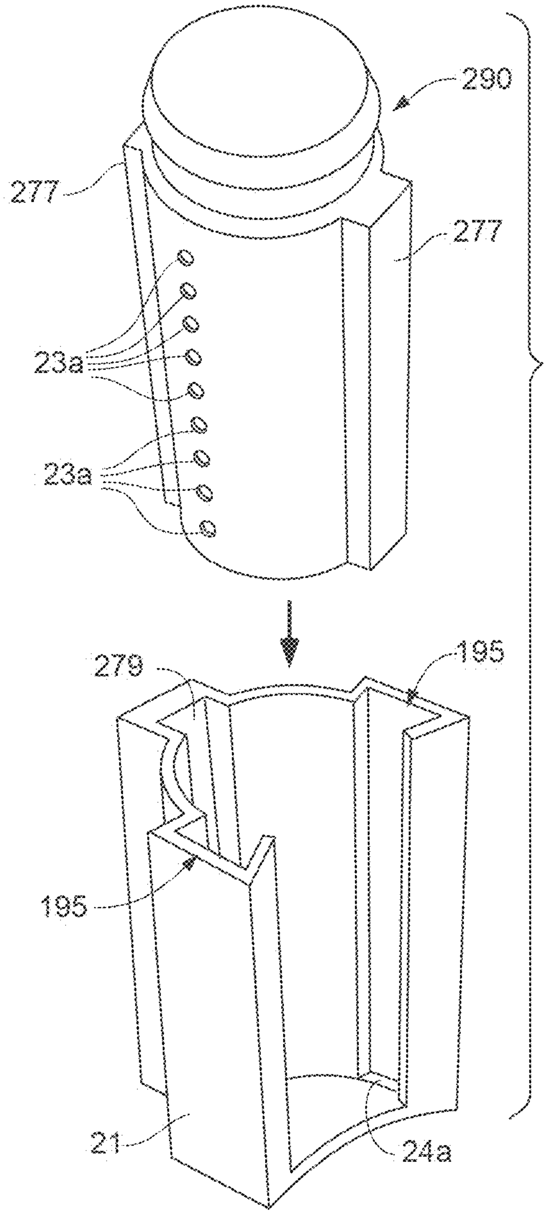
FIG. 9A
FIG. 9B
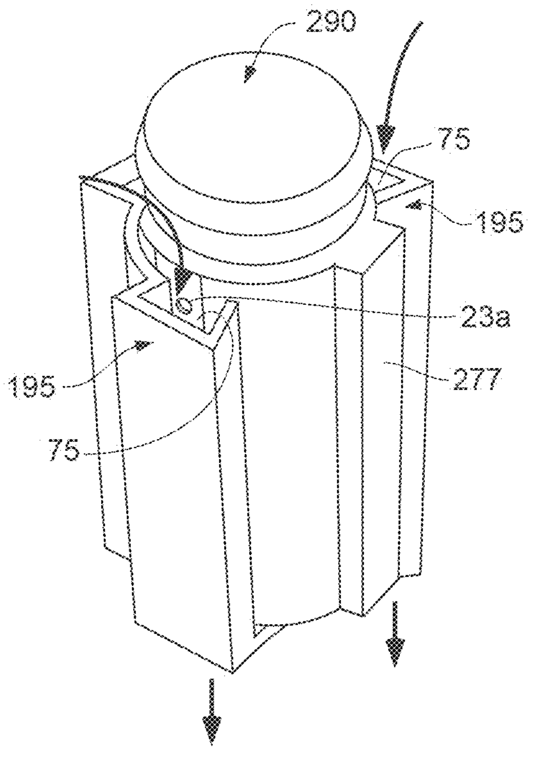

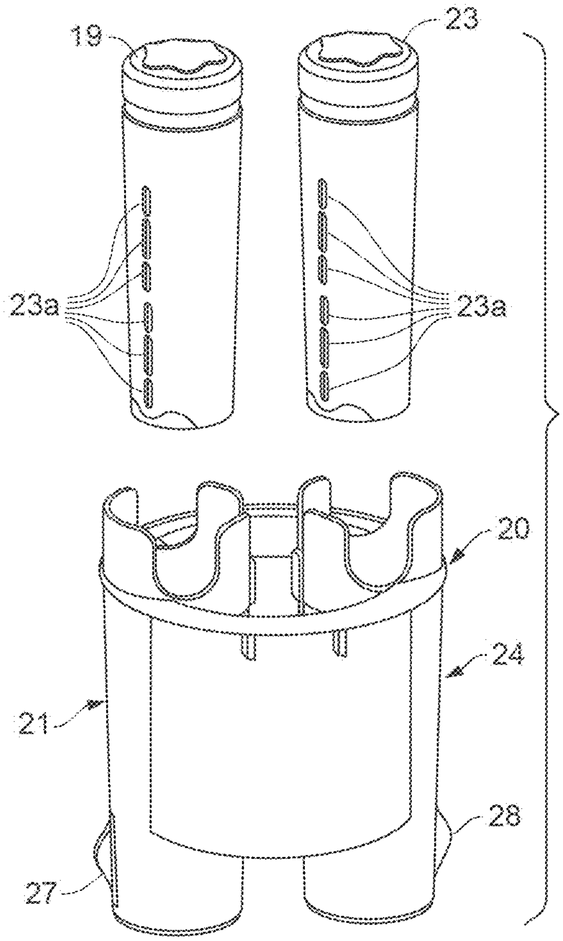
FIG. 13A
FIG. 13B
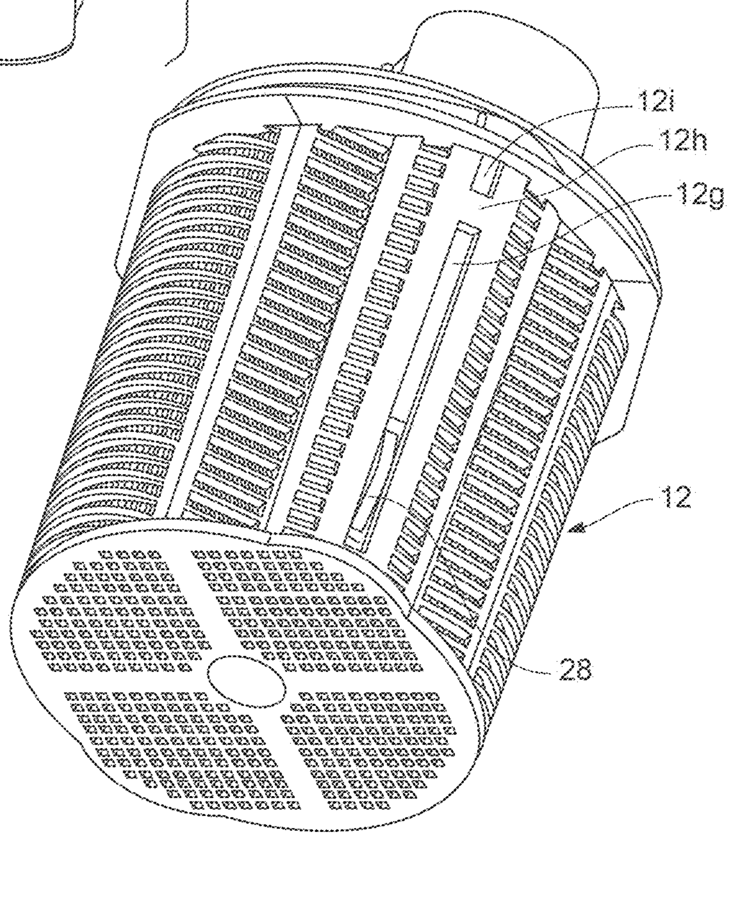

HOT TUB FILTERWELL DISPERSANT TECHNOLOGY

CROSS REFERENCE TO RELATED APPLICATIONS

This application is a continuation-in-part of U.S. patent application Ser. No. 18/116,615, filed Mar. 2, 2023, and claims priority to provisional U.S. patent application No. 63/372,328, filed Mar. 3, 2022, the contents of each of which are hereby incorporated herein by reference.

FIELD OF THE INVENTION

The present invention relates generally to hot tubs. More specifically, the invention relates to dispensers that release a dispersant or dispersants into the water in a hot tub.

BACKGROUND OF THE INVENTION

The use of dispensers that release a dispersant or dispersants into the water in a hot tub or the like to maintain the water, which recirculates within the hot tub, in a user-friendly condition is well known. In one example, a dispenser, which contains one or more dispersants, floats in the open area of the hot tub and releases dispersants into the hot tub water through water contact with the dispersants within the dispenser. In another example, a dispenser containing dispersants is installed in the open filterwell of a hot tub water circulation system. In still another example, a stick shaped dispenser is either inserted into the core of a filter cartridge, where it is free to rattle around as water flows through the filter core, or the stick shape dispenser may be extended perpendicularly outward from the underside of a skimmer basket.

Typically, hot tubs or the like have a filterwell coupled to a recirculating water system that circulates water through an open filterwell, which contains a filter cartridge that removes debris from the water as water also flows through the filter cartridge. In this type of system, a weir gate or similar device separates the filterwell from the area occupied by the hot tub users. Since the filterwell, which contains a filter cartridge, is located outside of the main hot tub sitting area, it is a convenient location for placing a dispenser therein, since it does not interfere with persons using the hot tub. Dispensing cartridges have been successfully placed in open water filterwell locations where the dispensers do not interfere with a normal flow of water through the filter media while at the same time retaining the ability to effectively deliver dispersant into the recirculating water in the filterwell.

While various devices have been employed to deliver dispersants into a hot tub filterwell, one of the more difficult locations to install a dispenser is within a filterwell basket, which is located in an inline water circulation system. Typically, rapid changes in water velocity within an inline water circulation system may have an adverse effect on a dispenser dispersant rate, as changes in water velocity past a dispenser's water ports can affect the dispenser dispersant rate. For example, water velocity changes in an inline circulation system may be due to starting and stopping of an inline water circulation pump or due to debris within the filterwell basket. Consequently, a dispenser dispersion rate may be low if the water circulation pump is off; however, when the water circulation pump is on, the dispenser dispersant rate may increase substantially in response to an increase in water velocity past the dispenser water ports. In still other cases, the instability of water flow past a dispenser located in an inline water circulation system, may change the dispenser dispersion rate because of debris in the skimmer basket that alters the water flow past the dispenser water ports.

BRIEF DESCRIPTION OF THE DRAWINGS

FIG. 9A is a schematic perspective view of a cartridge dispenser configured for receipt in a cartridge jacket in accordance with other embodiments of the invention;

FIG. 9B is a schematic perspective view of the cartridge dispenser and the cartridge jacket of FIG. 9A, with the cartridge dispenser received in the cartridge jacket;

FIG. 13A is an exploded view of two cartridge dispensers and a weir of the filterwell floating weir dispensing system of FIG. 12A; and FIG. 13B is a perspective view of a filterwell basket and a weir received therein of the filterwell floating weir dispensing system of FIG. 12A.

SUMMARY OF THE INVENTION

Figure 1:
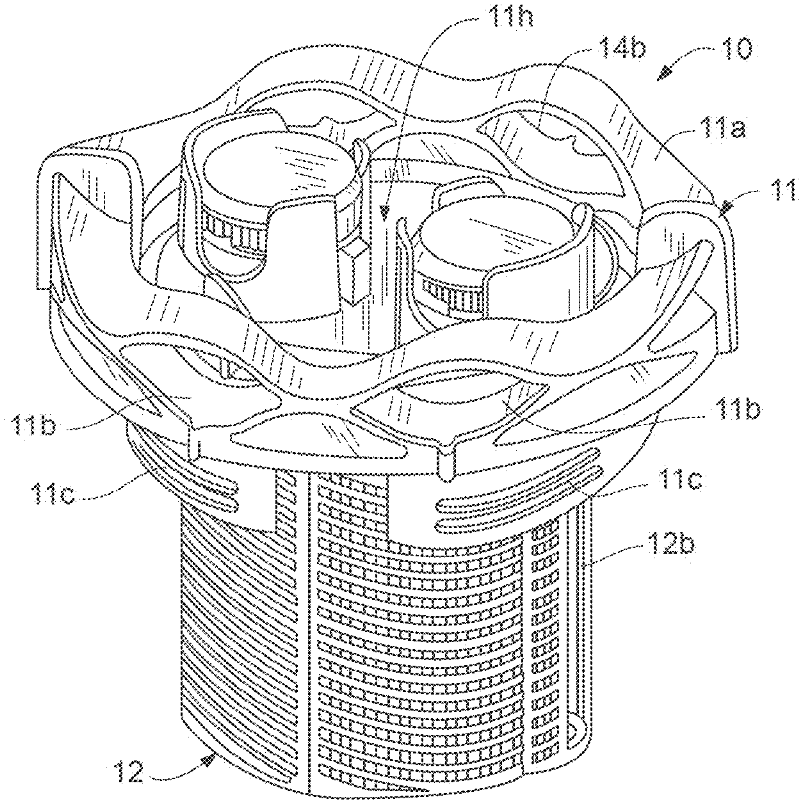
FIG. 1 is a perspective of view of an inline filterwell floating weir dispensing system mountable within an inline water circulation system of a hot tub.

In some embodiments, the invention provides an inline filterwell floating weir dispensing system including a floating weir located in a filterwell basket, with the floating weir floatingly supporting a cartridge dispenser with a set of dispensing ports therein that are shielded from unwanted water velocity changes within the floating weir through a high resistance water flow passage, which is formed between an interior surface of a cartridge jacket in the floating weir and an exterior surface of a replaceable cartridge dispenser. A set of protuberances in the cartridge jacket maintains the cartridge jacket in spaced condition from an outer surface of a dispensing cartridge creating a circumferential fluid chamber that forms a high flow resistance water path that shields the dispensing ports of the cartridge from the high velocity water flowing though the weir thereby avoiding unwanted rapid dispersant rates.

Certain embodiments of the invention provide a method of delivering a dispersant into water within a filterwell of a hot tub. The method involves (e.g., includes providing) a cartridge dispenser containing the dispersant. The cartridge dispenser includes one or more ports configured to place water within the filterwell in fluid communication with the dispersant contained in the cartridge dispenser. Preferably, the cartridge dispenser has a generally cylindrical configuration. In the present embodiments, the method includes placing the cartridge dispenser in a cartridge jacket such that a restricted flow passage is formed between an exterior of the cartridge dispenser and an interior of the cartridge jacket.

Some embodiments of the invention provide an apparatus for delivering a dispersant into water within a filterwell of a hot tub. The apparatus includes a cartridge dispenser containing the dispersant. In addition, the cartridge dispenser includes one or more ports configured to place water within the filterwell of the hot tub in fluid communication with the dispersant contained in the cartridge dispenser. In the present embodiments, the apparatus is configured to provide a restricted water flow passage alongside the one or more ports of the cartridge dispenser.

In certain embodiments, the invention provides a method of delivering a dispersant into water within a filterwell of a hot tub. The present method involves (e.g., uses) an apparatus comprising a cartridge dispenser. The cartridge dispenser contains the dispersant, and the cartridge dispenser includes one or more ports that are open to the dispersant contained in the cartridge. In the present embodiments, the apparatus bounds (e.g., defines) both a first restricted water flow passage and an open area water flow passage. Preferably, the method includes flowing the water through the apparatus such that a first amount of the water flows through the first restricted water flow passage, thereby placing such water into fluid communication with the dispersant contained in the dispenser cartridge via the one or more ports, and a second amount of the water flows through the open area water flow passage.

Some embodiments of the invention provide an apparatus for delivering a dispersant into water within a filterwell of a hot tub. The apparatus includes a cartridge dispenser containing the dispersant. The cartridge dispenser includes one or more ports configured to place water within the filterwell of the hot tub in fluid communication with the dispersant contained in the cartridge dispenser. The apparatus is configured to bound (e.g., define): (i) an open area water flow passage, and (ii) a first restricted water flow passage alongside the one or more ports.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Figure 2:
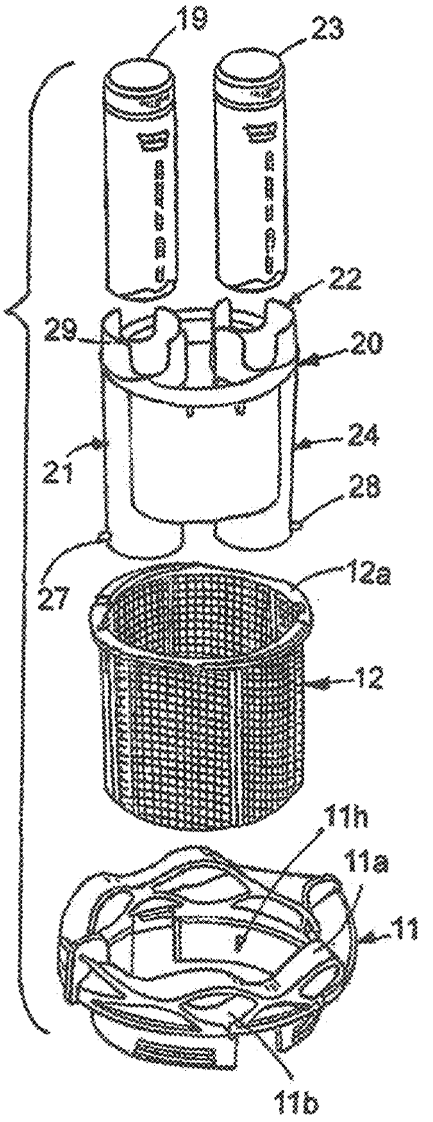
FIG. 2 is an exploded view of the inline filterwell floating weir dispensing system of FIG. 1.

FIG. 1 is a perspective of view of a floating weir dispensing system 10 mountable within an inline water circulation system of a body of recreational water, such as a hot tub or spa, and FIG. 2 is an exploded view of the floating weir dispensing system of FIG. 1. The floating weir dispensing system includes a retaining ring 11 with an undulating top surface 11*a* and a set of circumferential spaced lateral openings 11*b*, which prevent suction injury should someone accidently sit on retaining ring 11 as a water pump circulates water through the inline water circulation system.

Figure 1A:
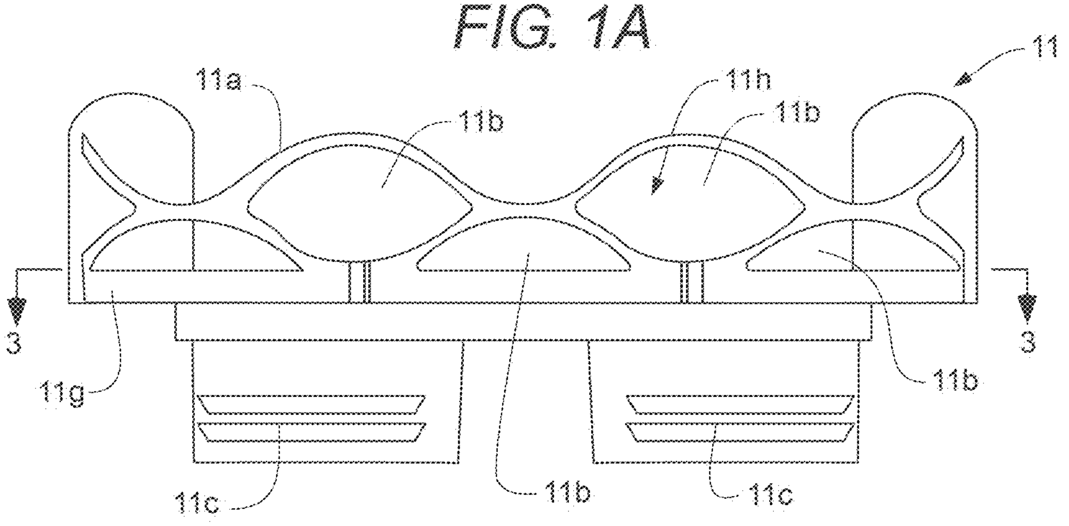
FIG. 1A is an isolated side view of a retaining ring for a floating weir dispensing system of FIG. 1.
Figure 4:
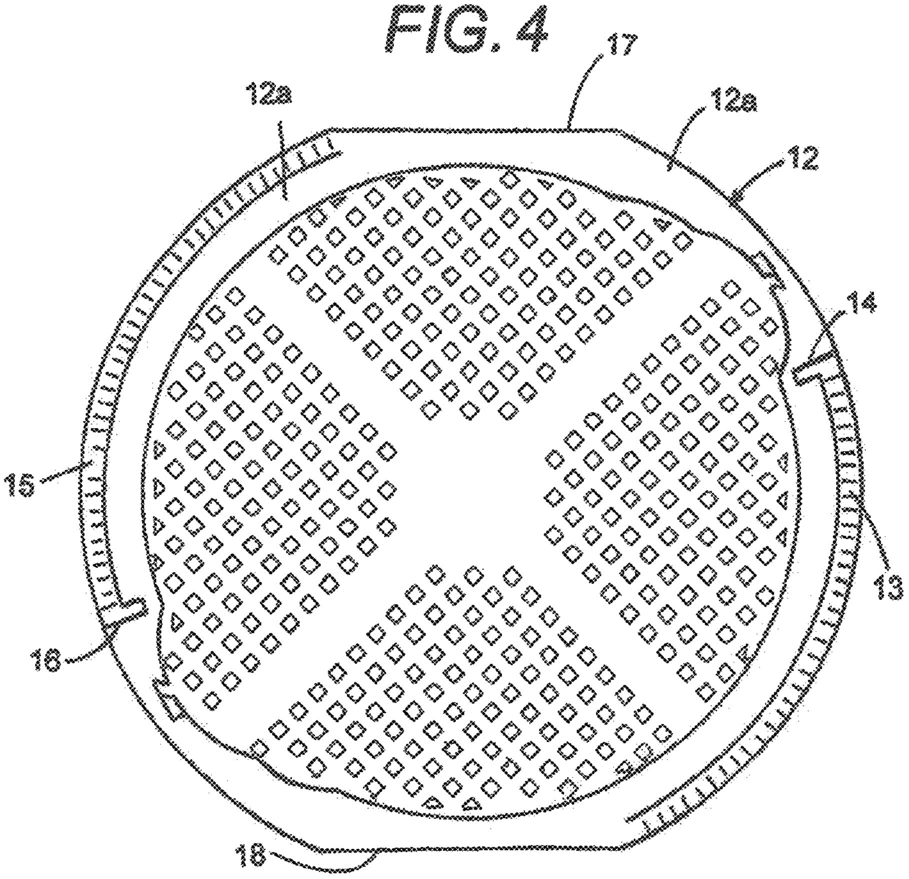
FIG. 4 is a top view of the filterwell basket of FIG. 2.
Figure 4A:
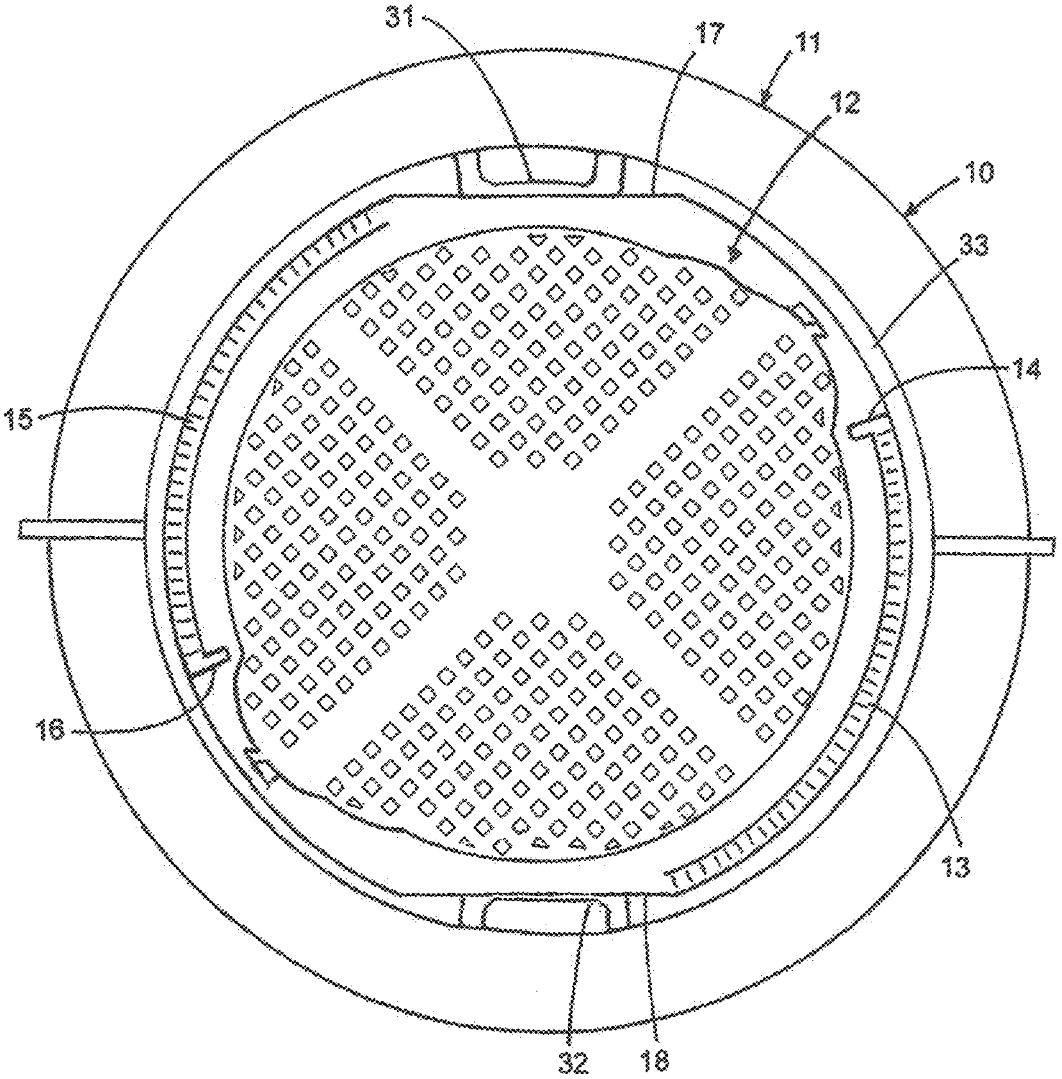
FIG. 4A is a top view of the filterwell basket of FIG. 2 and the locking ring of FIG. 2 in engagement with each other.

Retaining ring 11, which is also shown in a side view in FIG. 1A and a top view in FIG. 4A, includes a set of threads 11*c* that are circumferentially spaced around ring 11 for rotatable engagement of ring 11 with an inline filterwell housing. Ring 11 also includes an internal ledge 33 (FIG. 4A) that engages a rim 12*a* on filterwell basket 12 to support the filterwell basket within a hot tub circulation system.

FIG. 1 and FIG. 1A show an annular base 11*g* with a central water inlet 11*h* with the annular base 11*g* having an undulating top surface 11*a* and a sidewall with a set of openings 11*b* therein for water passage therethrough in the event of a blockage of the central water inlet to avoid suction injury to anyone inadvertently blocking the central inlet. An external thread 11*c* on retaining ring 11 is threadingly engageable with a filterwell housing typically found in a water recirculation system, such as a hot tub or spa.

In this example, as illustrated in FIG. 2, the floating weir 20 nests within filterwell basket 12 and a first cartridge dispenser 19 nests within a first cartridge jacket 21 and a second cartridge dispenser 23 nests within a second cartridge jacket 24. The floating weir is free to move up and down within basket 12 in response to water level changes within the floating weir while the cartridge dispensers 19 and 23 remain nested in a dispensing condition within the respective cartridge jackets of the floating weir.

FIG. 2 shows cartridge jacket 21 includes a split collar 29 and cartridge jacket 24 also includes a split collar 22 with reliefs or gaps in each of the split collars that permit a person to grasp and remove a cartridge dispenser held within the cartridge jacket. In the example shown in FIG. 6, the collars extend above a water line 9 when the weir is allowed to float freely with gaps or reliefs in the split collar also providing a path for water to enter the cartridge jacket.

Figure 3:
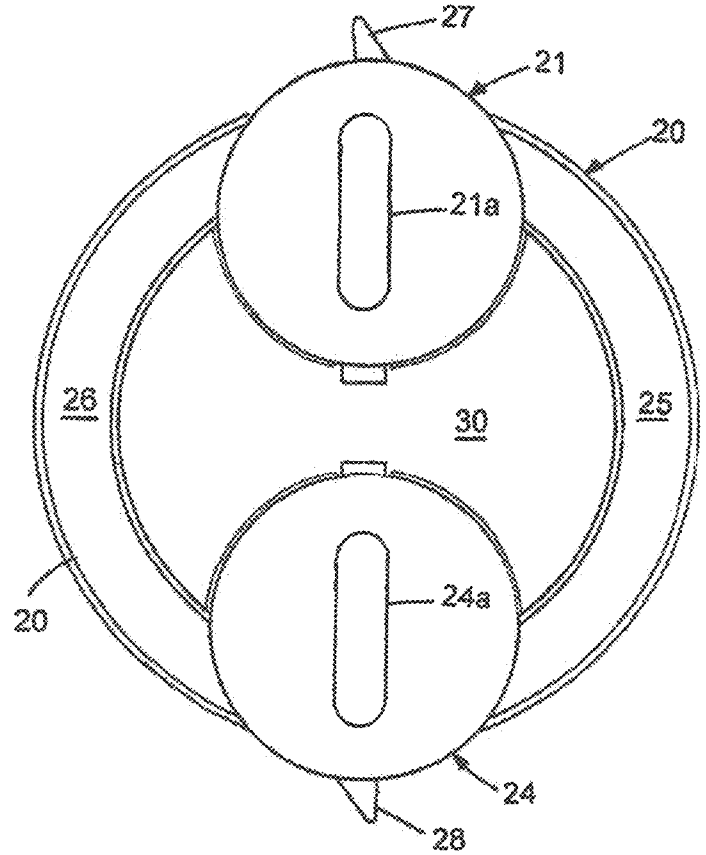
FIG. 3 is a bottom view of the inline filterwell floating weir of FIG. 2.

FIG. 3 is a bottom view of the floating weir 20 revealing a first trapped air float 25 and a second trapped air float 26 that support weir 20 while allowing the weir to move up and down within filterwell basket 12 as water flows through a central open region 30 in weir 20. As shown in FIG. 3, the first cartridge jacket 21 on weir 20 includes an elongated water outlet 21*a* and the second cartridge jacket 24 on weir 20 also includes an elongated water outlet 24*a*. Cartridge jacket 21 includes a lateral extension or follower 27 that engages a first guide slot 12*b* (FIG. 3B) in basket 12 and cartridge jacket 24 includes a lateral extension or follower 28 that engages a further guide slot (not shown) in basket 12, which is diagonally opposite of the first guide slot with the guide slots allowing the floating weir to move up and down within filterwell basket 12.

Figure 3A:
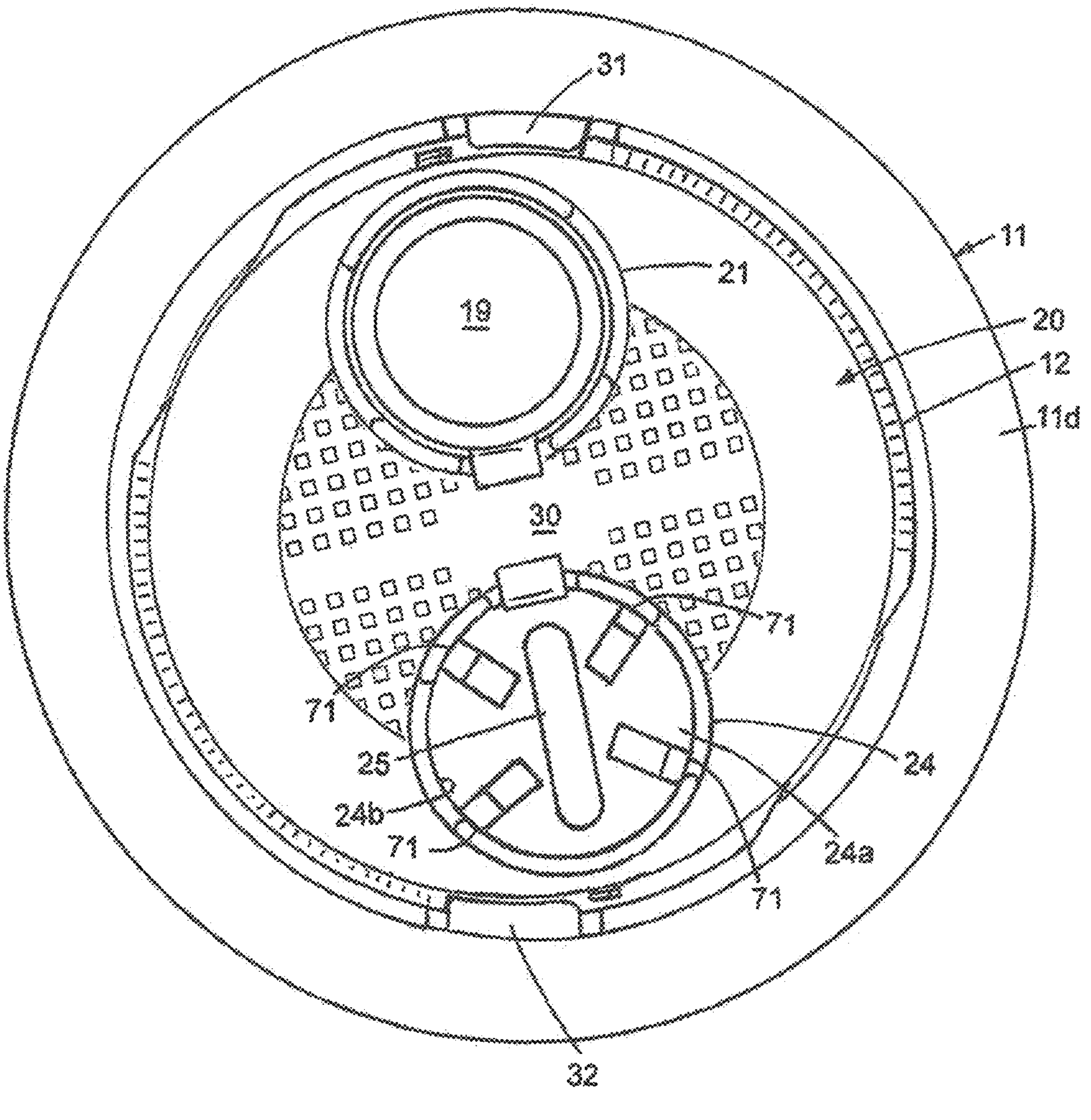
FIG. 3A is top view of the floating weir of FIG. 2 with a retaining ring and a cartridge jacket with a cartridge dispenser and a further cartridge jacket without a cartridge dispenser.
Figure 3B:
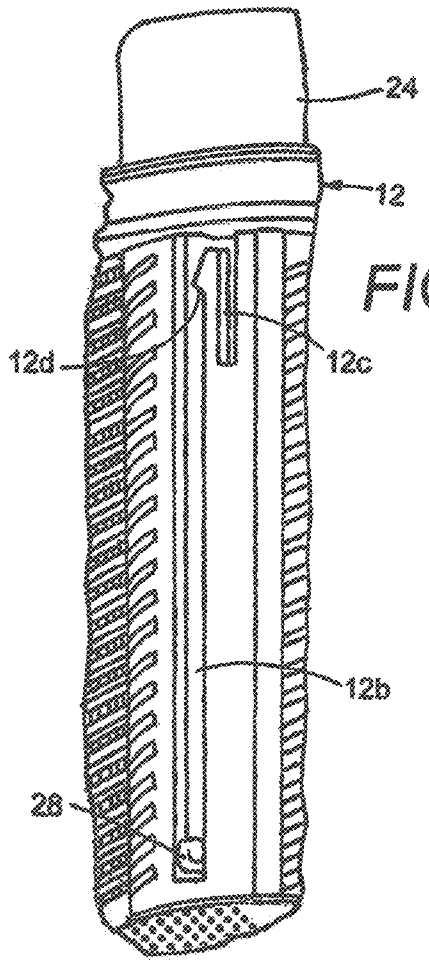
FIG. 3B is a partial sectional view of a side portion of the filterwell basket of FIG. 2, showing a guide slot in the filterwell basket with a floating weir follower weir in the guide slot and a latch that retains the floating weir within the filterwell basket.

FIG. 3B is an isolated view of a portion of filterwell basket 12 that includes a guide slot 12*b* with a follower 28 (also FIG. 3) extended therethrough. Located at the top end of guide slot 12*b* is an integral cantilevered stop 12*c* with a hook 12*d* that engages weir follower 28 to limit upward buoyant movement of weir 20 within basket 12. Similarly, an identical guide slot on a diagonally opposite side of basket 12 includes an identical cantilevered stop having a hook (not shown) that engages follower 27 on weir 20. While the cantilevered stops are integral to the basket and limit the upward buoyant movement to maintain the floating weir within the filterwell basket, the cantilevered stops are also yieldable to hand pressure to allow removal of floating weir from basket 12 by exerting an upward hand force on weir 20. This feature is useful since it allows removal of the floating weir 20 to remove any debris that may have accumulated in the weir or the filterwell basket.

Figure 3C:
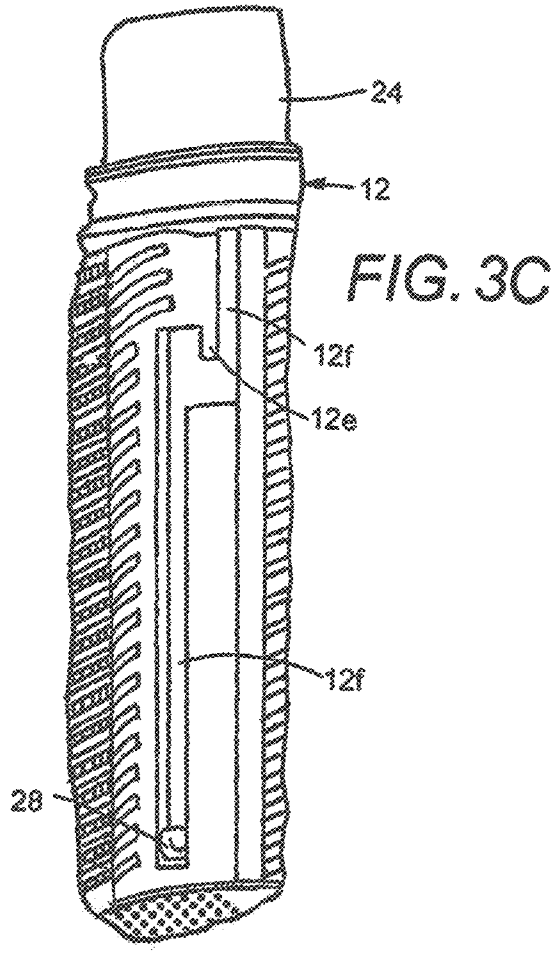
FIG. 3C is a partial sectional view of a side portion of the filterwell basket of FIG. 3, showing a lateral offset guide slot with a lip to retain the floating weir within the filterwell basket.

FIG. 3C is an isolated view of a portion of filterwell basket 12 with an alternate method of retaining the weir 20 in the filter basket as the weir moves up and down in response to water level changes. FIG. 3C shows filterwell basket 12 includes a guide slot 12*f* where a top portion of the guide slot 12*f* is laterally offset from a lower portion of the guide slot 12*f*. In this example, follower 28 normally moves up and down in the lower portion of the guide slot 12*f* in response to buoyant action of the weir. A lip 12*e* extends downward preventing follower 28 from entering the top portion of guide slot 12*f* as the floating weir moves up and down within basket 12. Similarly, an identical off set guide slot with a lip (not shown) on a diagonally opposite side of basket 12 engages follower 27 on weir 20 to prevent the follower 27 from entering the top portion of an identical offset guide slot with a retaining lip as floating weir 20 moves up and down within basket 12.

A feature of the offset guide slot with a laterally offset retaining lip on both sides of the filterwell basket is that to remove weir 20 from the filterwell basket 12 one needs to slightly rotate the weir to bring the follower 28 into the top guide slot 12*f* and the follower 27 into the identical offset guide slot on the opposite side of the filterwell basket 12. Once the followers 28 and 27 are in the top portion of the guide slots, one can pull weir 20 free of the filterwell basket 24.

A benefit of the offset guide slots on opposite sides of the filterwell basket is that it prevents the floating weir 20 from being removed from the filterwell basket unless one manually rotates the floating weir to bring the followers 28 and 27 into the top portion of the guide slots.

Figure 6:
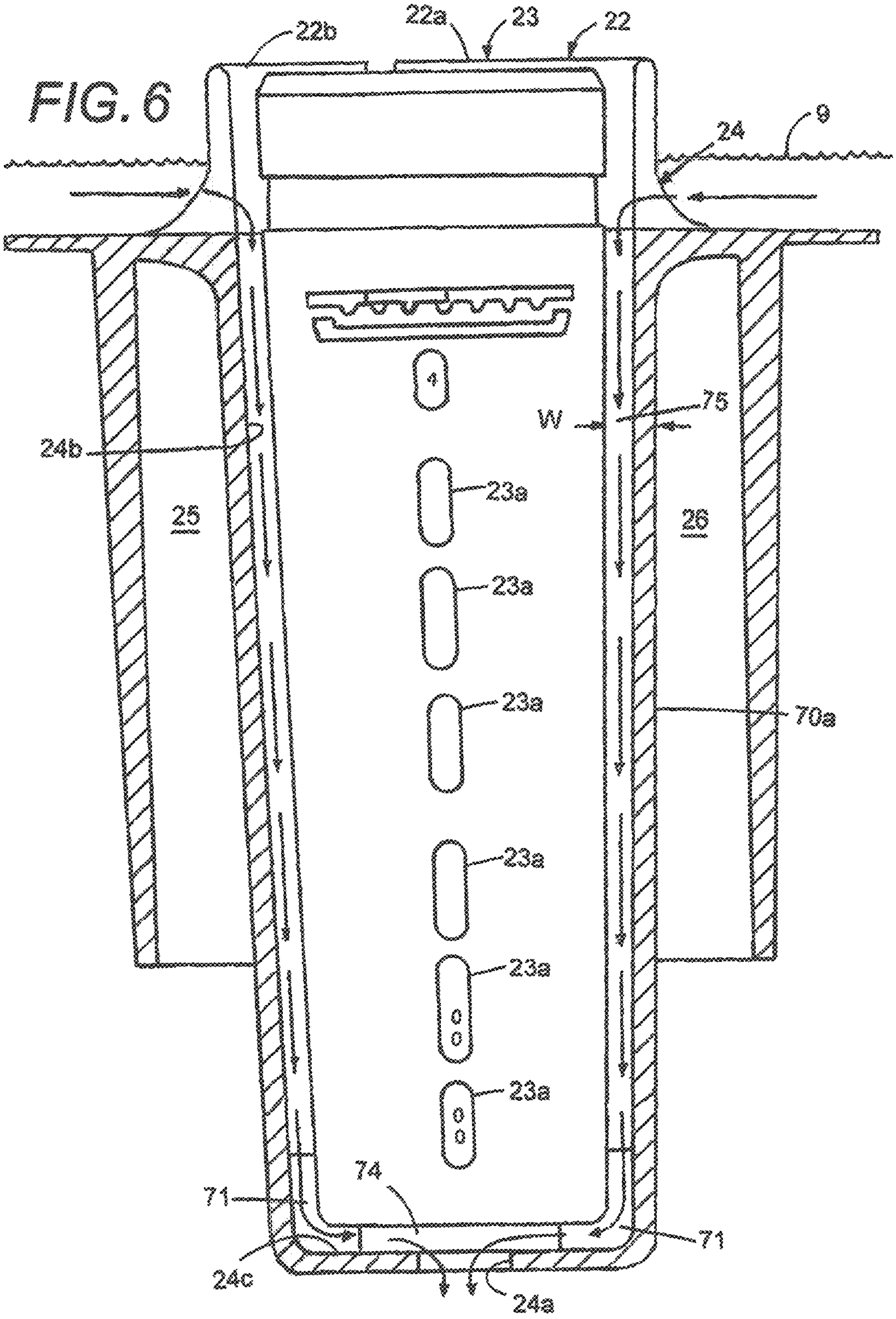
FIG. 6 is a sectional view of a cartridge jacket in the floating weir of FIG. 2 supporting a cartridge dispenser in a spaced condition.

FIG. 3A is a top view of ring 11, revealing a first extension or tab 32 and a second extension or tab 31 that engages a rim of filterwell basket 12 to maintain the filterwell basket 12 in a locked condition with respect to ring 11. FIG. 3A shows weir 20 cartridge jacket 21 contains a cartridge dispenser 19, while cartridge jacket 24, which is empty, reveals a set of internal L-shaped protuberances 71 that extend across cartridge jacket bottom end 24*a*, which are shown in FIG. 6 to cooperatively maintain a cartridge dispenser in a spaced condition from side wall 24*b* and end wall 24*a* to form a high resistance annular flow path around an interior surface of a dispensing cartridge located therein.

FIG. 4 is a top view of an empty filterwell basket 12 with the filterwell basket including a rim 12*a* having a first flat 17 and a second flat 18 located diagonally opposite of flat 17. The flats permit assembly and rotational engagement of rim 12*a* with retraining ring 11. That is, an internal basket ledge 33 in retaining ring 11 supports filterwell basket 12 within the inline filterwell dispensing system as shown in FIG. 1. In this example, filterwell basket 12 includes an arcuate ramp 13 having a stop 14 located on one side of basket 12 and located diagonally opposite is a second arcuate ramp 15 having a stop 16 that are used to support and secure filterwell basket 12 to retaining ring 11, as shown in FIG. 3A and FIG. 1.

FIG. 4A is a top view showing a partial assembly view of filterwell basket 12 mounted on an internal basket ledge 33, which is an internal component of retaining ring 11. To mount the filterwell basket in the retaining ring 11, the flat 17 of basket 12 is aligned with tab 31 and the flat 18 of basket 12 is aligned with tab 32, which allows the filterwell basket rim 12*a* to clear tab 31 and 32 until rim 12*a* comes to rest on the internal basket ledge 33. Once the basket rim 12*a* is supported by the internal basket ledge 33, one rotates the basket so as to cause the tabs 31 and 32 to engage the ramps 13 and 15 until the resulting interference/friction between the tabs and ramps is sufficient to hold the filterwell basket 12 in place within the retaining ring 11.

FIG. 4A shows retaining ring 11 with an internal cylindrical filterwell basket support ledge 33, a first internal tab 31 and a second internal tab 32, with the first internal tab and the second internal tab diagonally spaced from each other to cooperatively limit an axial upward displacement of a filterwell basket 12 through a sandwiching of a filterwell basket rim 12*a* therebetween ledge 33 and tab 31 and 32. That is, the filterwell basket support ledge 33 limits an axial downward displacement of the filterwell basket with respect to retaining ring 11, and the internal tabs 31 and 32 limit an upward displacement of filterwell basket with respect to ring 11 to maintain the filterwell basket 12 within the retaining ring.

FIG. 4A shows filterwell basket 12 with a flat 17 in alignment with tab 31 and flat 18 in alignment with tab 32 with sufficient clearance to allow filterwell basket rim 12*a* to by-pass tabs 31 and 32 and fall into engagement with the internal ledge 33 located within retaining ring 11. Next, one rotates the ring 11 with respect to filterwell basket rim 12*a* until the stops 14 and 16 engage tab 32 and tab 31 to retain the filterwell basket in position within the retaining ring 11. In this example, a first arcuate ramp 13 having a stop 14 and a second arcuate ram 15 having a stop 16 provide for locking rotational engagement of filterwell basket 12 rim 12*a* within the retaining ring 11.

Figure 5A:
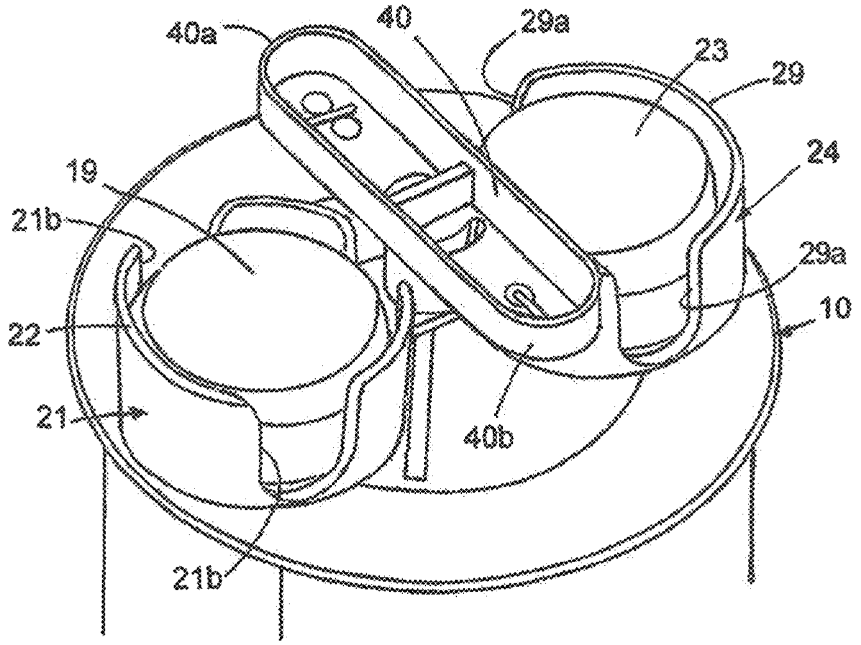
FIG. 5A is a perspective view of a cartridge retainer with a rotatable cross bar in a cartridge release position.

FIG. 5A is a perspective isolated view of one embodiment of a cartridge retainer 40 that can simultaneously hold or release two cartridge dispensers 19 and 23 from within their cartridge jackets through a rotatable cross bar with a first looped end 40*a* and a second looped end 40*b* that are engageable with a top end of the cartridge dispensers located in the cartridge jackets of the floating weir. FIG. 5A shows the cartridge retainer located in a cartridge release position that allows a person to grasp the top end of cartridge 23 through relief areas 29*a* and 29*b* and axially remove cartridge dispenser 23 from cartridge jacket 24. Similarly, one can grasp cartridge dispenser 19 through relief areas 21*a* and 21*b* to pull cartridge dispenser 19 out of cartridge jacket 21.

Figure 5B:
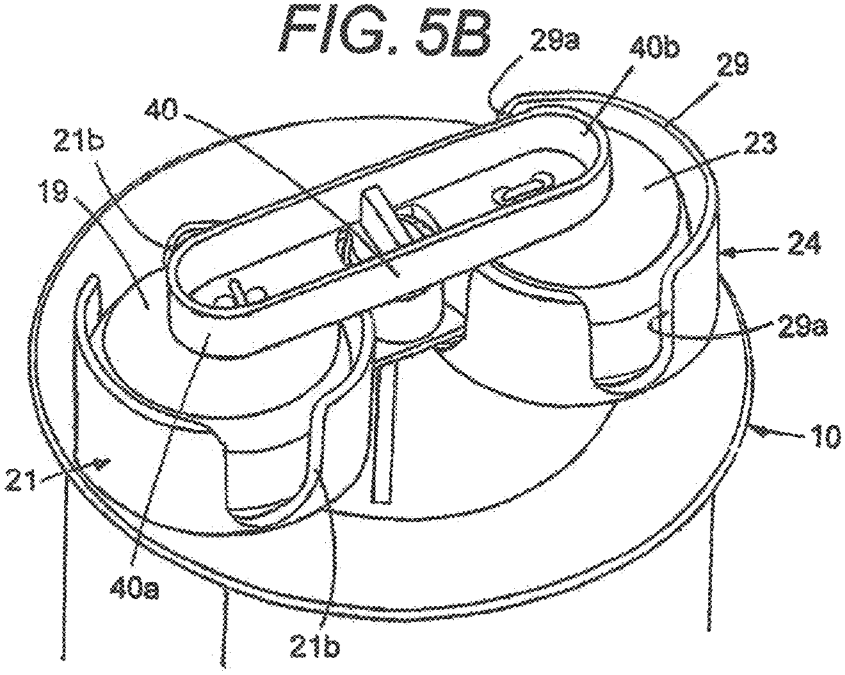
FIG. 5B is a perspective view of a cartridge retainer with a rotatable cross bar in a cartridge hold position.
Figure 5C:
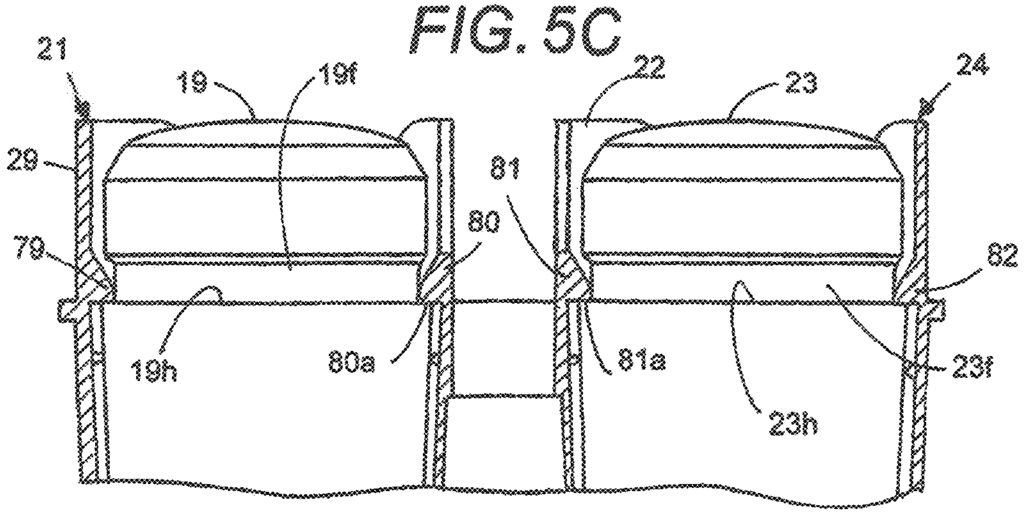
FIG. 5C is a partial sectional view of the cartridge jackets in the floating weir showing a resilient latch securing each of the cartridge dispensers within the respective cartridge jackets.

FIG. 5C is a sectional view of cartridge jacket 21 and cartridge jacket 24 with cartridge jacket 21 showing a cartridge dispenser 19 therein with a top end of the cartridge dispenser 19 located within split collar 29.

In this example, cartridge dispenser 19 includes a recessed region 19*f* having a ledge 19*h* engageable with a lip 79 in jacket 21 and a lip 80*a* in a resilient latch 80, which is located diametrically opposite from lip 79. The resilient latch 80 comprises a cartridge retainer, which flexes outward to allow axial insertion of cartridge dispenser 19, into cartridge jacket 21 and when unflexed returns to the cartridge engaging position shown in FIG. 5*c* thereby securing cartridge dispenser 19 within cartridge jacket 21.

Similarly, cartridge dispenser 23 includes a recessed region 23*f* having a ledge 23*h* engageable with a lip 82 in jacket 24 and a lip 81*a* engaging a resilient latch 81, which is located diametrically opposite from lip 82. The resilient latch 81 comprises a cartridge retainer, which flexes outward to allow axial insertion of cartridge 23, into cartridge jacket 24 and when unflexed returns to the cartridge engaging position shown in FIG. 5C thereby securing cartridge 23 within cartridge jacket 24.

Thus, in the example shown in FIGS. 5A and 5B, the cartridge retainer 40 engages a top end of the cartridge dispensers 19 and 23 to hold a cartridge within the cartridge jacket, while in the example shown in FIG. 5C, the cartridge retainer engages a ledge within a cartridge dispenser to secure a cartridge therein. Other cartridge retainers that may be used include threads on the cartridge, bayonet tabs on the cartridge that lock in place, a snap-on connector on a bottom end of the cartridge, magnets, a lanyard, or friction engagement of the cartridge dispenser with the cartridge jacket.

FIG. 6 is an isolated sectional view of cartridge jacket 24 with a split collar 22 containing a cartridge dispenser 23 with the cartridge dispenser 23 supported in a spaced condition from sidewall 24*b* and end wall 24*c* by a set of L shaped protuberances 71. In this example, the L-shaped protuberances simultaneously engage side wall 24*b* and end wall 24*c* forming an annular flow chamber 75 around the cartridge dispenser 23. When the filterwell pump is on, water is rapidly drawn through the larger open area passage 30 in weir 20; however, the flow chamber 75, which is isolated from the larger open area passage 30, provides a restricted water flow path that prevents a premature and rapid dissolving of the contents of a cartridge dispenser located in cartridge jacket 24. That is, a lower velocity region in flow chamber 75 creates a flow environment where the existing cartridge dispenser settings can control and maintain the output within a desired range that prevents a premature and rapid dissolving of the contents of a cartridge dispenser located therein. In this example, the water in chamber 75 flows past and in and out of the cartridge dispensing ports 23*a* located along an outer vertical element of cartridge dispenser 23 before exiting through port 24*a* in cartridge jacket 24.

A feature of the restricted annular flow passage 75 is that the viscous flow resistance due to restricted spacing between the exterior surface between the cartridge dispenser and the jacket wall 24*b* isolates the water entering and flowing through annular passage 75 to prevent a premature dissolution of the contents of the cartridge dispenser located therein.

In this embodiment, cartridge jacket 21 also includes an identical restricted flow passage that isolates the velocity of the water past a cartridge dispenser in cartridge jacket 21 from the water flowing through the larger open area 30 in weir 20.

A further feature of the invention is that the restricted water flow path, which is shown in FIG. 6, is formed on-the-go by inserting a cartridge dispenser into a cartridge jacket 21, 24.

In the example shown, the cartridge jacket contains a frusto conical interior for engaging with a frusto conical shape cartridge. An example of a prior art cartridge dispenser containing a frusto conical exterior that is suitable for mounting within cartridge jacket 24 is shown and described in applicant's U.S. Pat. Nos. 7,059,540; 7,487,790 and 8,617,481, which are included by reference.

While the restricted water flow passage formed by geometrical restriction is shown, other flow restrictors could include a mesh, a louver or membrane in the flow passage. In still other cases, a different location for water entering cartridge jacket 21 or cartridge jacket 23 may be used to limit velocity past the cartridge dispenser therein to prevent unwanted velocity changes in water flowing past a cartridge dispenser therein, which can adversely affect a dispersant rate of the dispensing cartridge located therein.

Figure 7:
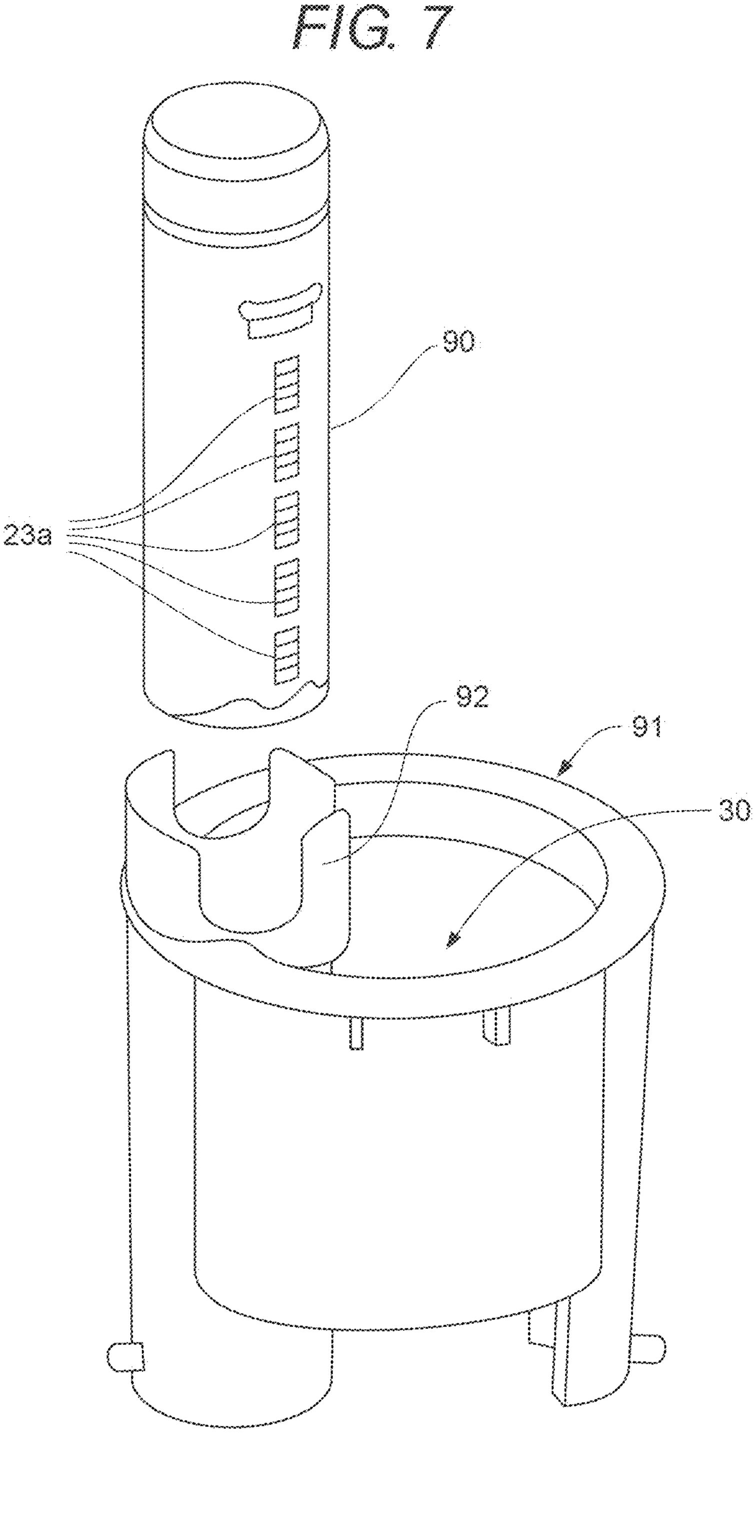
FIG. 7 shows a floating weir with a single cartridge dispenser located therein.

FIG. 7 shows an example of floating weir 91 with a single cartridge jacket 92 for receiving a cartridge dispenser 90. In this example, cartridge jacket 92 contains an identical flow restricted passage shown in cartridge jacket 21 and cartridge jacket 24. The example shown in FIG. 7 is suitable if only one cartridge dispenser is to be placed in the floating weir 91. While cartridge jacket 92 is shown along a side of the floating weir, the cartridge jacket 92 may be supported in other locations within weir 91 without departing from the scope of the invention. In FIG. 7, open area water flow passage 30 is shown. As with the embodiment of FIG. 2, the open area water flow passage 30 allows water to flow through (e.g., into a top region of, and out through a bottom region of) the apparatus.

Figure 12A:
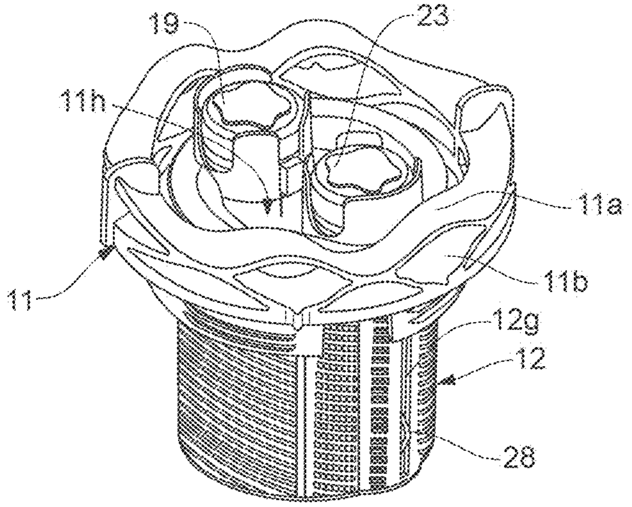
FIG. 12A is a perspective of view of a filterwell floating weir dispensing system mountable within a water circulation system of a hot tub in accordance with another embodiment of the invention.
Figure 12B:
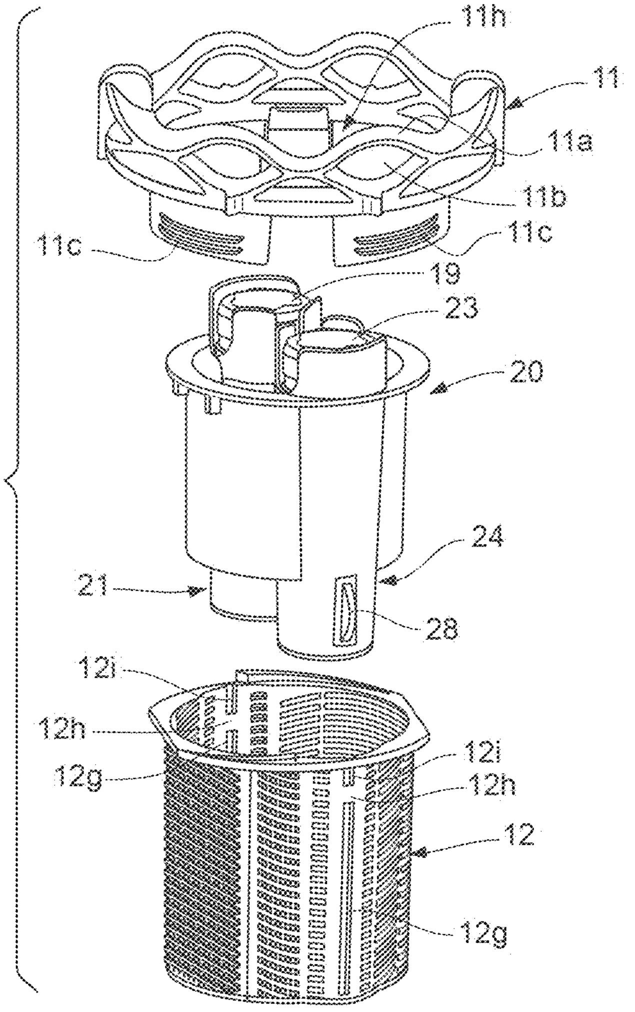
FIG. 12B is an exploded view of the filterwell floating weir dispensing system of FIG. 12A.

FIGS. 12A and 12B show another embodiment of a filterwell floating weir dispensing system. Here, the filterwell basket 12 includes a modified guide slot (or "retention slot") configuration. This is perhaps best seen in FIG. 13B, which shows the filterwell basket 12 and the weir 20 received therein. In more detail, the illustrated guide slot 12*g* terminates at a physical barrier 12*h* at (e.g., bounding) a top end of the guide slot 12*g*. As is perhaps best seen in FIG. 12B, there is an identical second guide slot 12*g* on a diagonally opposite side of the filterwell basket 12 that is configured to receive the other follower 27 on the illustrated weir 20. During operation, the two physical barriers 12*h* limit upward buoyant movement of the weir 20 within the filterwell basket 12.

Further, the physical barrier 12*h* separates the guide slot 12*g* from an upper slot 12*i*, which extends along the same axis that the guide slot 12*g* extends along. Thus, the illustrated guide slot 12*g* and upper slot 12*i* are arranged (e.g., coaxially) in a broken line. In the illustrated design, the physical barrier 12*h* is a portion (e.g., a web portion) of the sidewall of the filterwell basket 12. In addition, the two followers (or "retention tabs") 27, 28 projecting respectively from the two illustrated cartridge jackets 21, 24 each have a ramped upper portion and a ramped lower portion. The ramped upper and lower portions of each illustrated follower

27, 28 terminate at a peaked middle region, which can optionally be rounded, chamfered, or the like. The two followers 27, 28 are configured to be received respectively in the two guide slots 12*g*, which are located on diagonally opposite sidewall areas of the filterwell basket 12.

During operation, the followers 27, 28 remain in the two guide slots 12*g*. The vertical extent of the guide slots 12*g* allows the weir 20 to move upwardly and downwardly somewhat as it floats in the water of the filterwell. When it is desirable to remove the weir 20 from the filterwell basket 12, the physical barriers 12*h* can be overcome by forcing (e.g., lifting) the weir 20 out of the filterwell basket 12, whereby the ramped upper portions (or "upper ramps") of the followers 27, 28 bear outwardly on (thereby forcing a deformation of) the physical barriers 12*h*. In more detail, this involves outward deformation (e.g., flexing) of the web portions (which serve as physical barriers 12*h*) of the sidewall of the filterwell basket 12. The followers 27, 28 are thereby forced upwardly past the physical barriers 12*h* and into the upper slots 12*i*, at which point it is possible to readily pull the weir 20 free of the filterwell basket 12.

In view of the foregoing descriptions of various advantageous filterwell basket 12 options, it is to be appreciated that certain embodiments provide a filterwell basket 12 of the nature described herein. Some of these embodiments provide the filterwell basket 12 on its own. In other embodiments, the filterwell basket 12 is provided together with a corresponding weir 20 and/or together with other components noted herein.

Thus, in some embodiments, the invention provides a method of delivering a dispersant into water within a filterwell of a hot tub. The method involves (e.g., includes providing) a cartridge dispenser 19, 23, 90, 190, 290, 390, 490 containing the dispersant. The cartridge dispenser 19, 23, 90, 190, 290, 390, 490 preferably has a generally cylindrical configuration, and it includes one or more ports 23*a* configured to place water within the filterwell in fluid communication with the dispersant contained in the cartridge dispenser. In some cases, the method includes positioning (e.g., placing) the cartridge dispenser 19, 23, 90, 190, 290 in a cartridge jacket 21, 24, 92 such that a restricted flow passage 75 is formed between an exterior of the cartridge dispenser and an interior of the cartridge jacket. As can be appreciated from the foregoing discussion and by referring to FIGS. 2 and 6-9B, this may involve inserting (or otherwise loading) the cartridge dispenser 19, 23, 90, 190, 290 into the cartridge jacket 21, 24, 92.

In certain embodiments, the present method includes a step of operating (e.g., adjusting) an optional cartridge retainer 40 so as to engage the cartridge dispenser 19, 23 and thereby hold it (e.g., secure or lock it releasably) within the cartridge jacket 21, 24. This step, however, is optional.

Preferably, the restricted flow passage 75 has a gap width of greater than 1/32 inch and less than 1/4 inch, such as greater than 1/32 inch and less than 1/8 inch, e.g., about 1/18-1/14 inch. In one non-limiting example, the gap width of the restricted flow passage 75 is about 1/16 inch.

Figure 8:
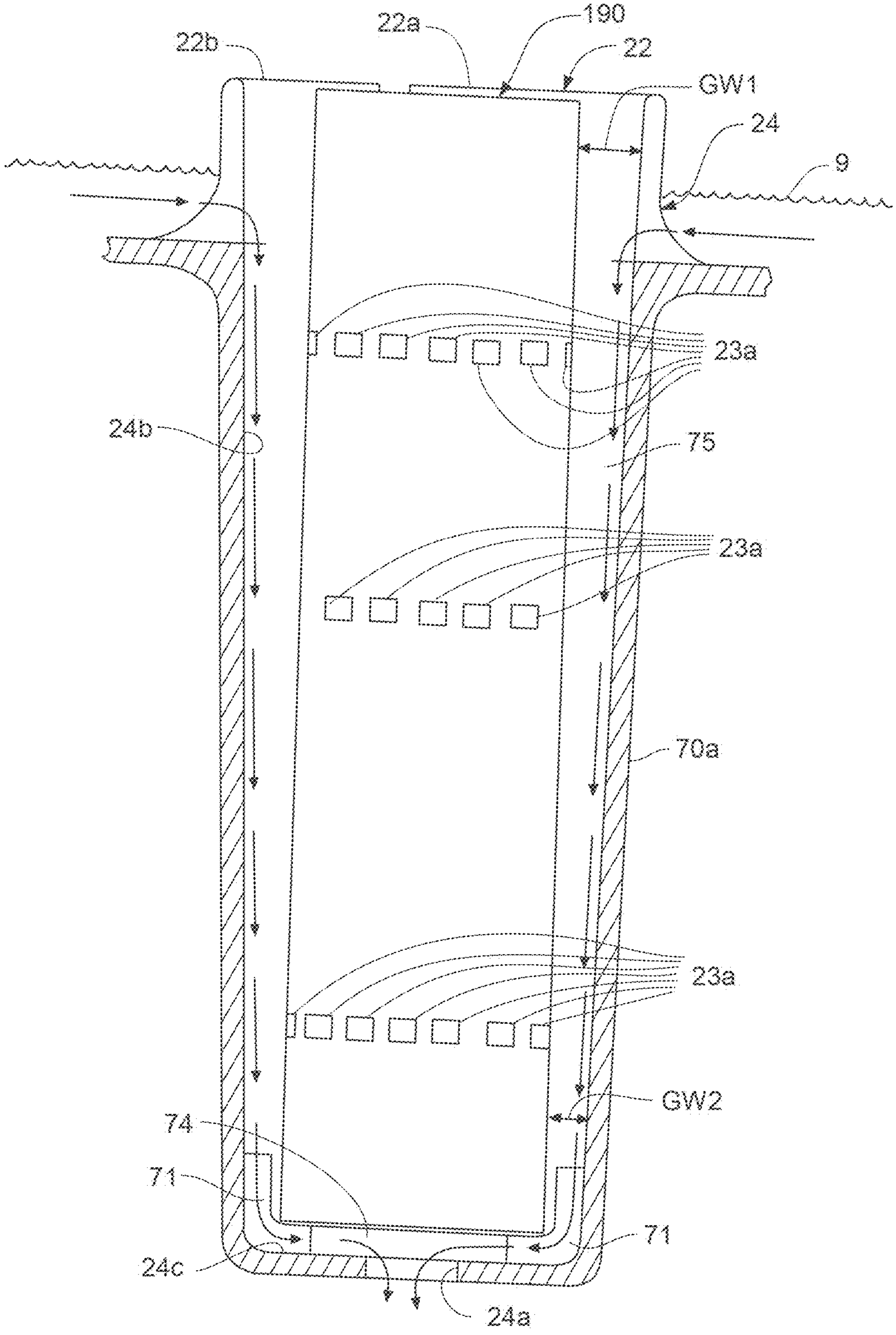
FIG. 8 is a broken-away sectional view of a cartridge jacket in which a cartridge dispenser is received in accordance with certain embodiments of the invention.

Some embodiments involve the gap width being the same (or at least substantially the same) at all locations of the restricted flow passage 75. This can optionally be the case in embodiments like that shown in FIG. 6. Other embodiments involve the gap width being substantially different at different locations of the restricted flow passage 75. One non-limiting example is shown in FIG. 8.

In some cases, the gap width at all locations of the restricted flow passage 75 is within any one or more of the ranges noted above. If desired, the average gap width (and/or the maximum gap width) for all locations of the restricted flow passage 75 can be within any one or more of the noted ranges.

As noted above, the restricted flow passage 75 can optionally be an annular passage. In some cases, the restricted flow passage 75 is a circumferential fluid chamber (or "water jacket") that surrounds an entire circumference of the exterior of the cartridge dispenser 19, 23, 90, 190. In certain embodiments, the restricted flow passage 75 is a circumferential fluid chamber surrounding the entire circumference of the exterior of the cartridge dispenser 19, 23, 90, 190 that extends at least substantially entirely from a top region of the cartridge dispenser to a bottom region of the cartridge dispenser. Reference is made to FIGS. 6 and 8.

As described and illustrated previously, the interior of the cartridge jacket 21, 24, 92 can optionally taper from a wider top region to a more narrow bottom region. This is shown, for example, in FIGS. 6 and 8. Furthermore, in some cases, the exterior of the cartridge dispenser tapers from a wider top region to a more narrow bottom region. One such example is shown in FIG. 6.

More generally, the cartridge dispenser 19, 23, 90, 190, 290, 390, 490 preferably has a generally cylindrical configuration. It may be tapered, or frustoconical, as noted above. Or it may be a regular, non-tapered cylinder. Another possibility is to provide a generally cylindrical configuration with slightly concave (e.g., "apple-core" or "dog bone" type) shape, such that a middle region of the cartridge dispenser has a smaller diameter than its top and bottom end regions. Various other generally cylindrical configurations can also be used.

In certain embodiments, a gap width of the restricted flow passage is greater adjacent a top region of the cartridge dispenser than it is adjacent a bottom region of the cartridge dispenser. One such example is shown in FIG. 8. Here, it can be seen that a first gap width GW1 adjacent a top region of the cartridge dispenser 190 is greater than a second gap width GW2 adjacent a bottom region of the cartridge dispenser. This, however, is by no means required. For example, the interior of the cartridge jacket is not required to taper from a wider top region to a more narrow bottom region. Instead, it can have a regular, non-tapered cylindrical shape. As another example, in embodiments where an interior of the cartridge jacket is tapered, a cartridge dispenser with a corresponding tapered configuration can be used, as discussed previously. Reference is made to FIG. 6.

In certain embodiments, the dispersant contained in the cartridge dispenser 19, 23, 90, 190, 290, 390, 490 comprises zinc, malic acid, or both. Various cartridge dispensers containing dispersants that comprise one or both of zinc and malic acid are commercially available.

In the present method embodiments, the step of delivering the dispersant into water within the filterwell of the hot tub preferably is performed for at least two weeks (e.g., at least three weeks, or at least four weeks) before the dispersant contained in the cartridge dispenser 19, 23, 90, 190, 290, 390, 490 is depleted. The advantageous restricted flow passage configurations described and illustrated herein facilitate using cartridge dispensers 19, 23, 90, 190, 290, 390, 490 of the nature described herein to achieve such longevity in delivering the dispersant (in many cases, about four weeks before depletion) while also producing a desirable (e.g., effective and safe) amount of dispersant in the water. Cartridge dispensers of the types shown and described in applicant's U.S. Pat. Nos. 7,059,540; 7,487,790 and 8,617,481 may be used. Suitable cartridge dispenses can be obtained commercially from King Technology, Inc. (Minnetonka, Minnesota, U.S.A.).

In some of the present method embodiments, the cartridge jacket 21, 24, 92 and the cartridge dispenser 19, 23, 90, 190, 290 placed therein are located in the water within the filterwell of the hot tub during the delivery of dispersant into the water within the filterwell. In some cases, the method includes floating (e.g., by virtue of one or more optional trapped air floats 25, 26) the cartridge jacket 21, 24, 92 and the cartridge dispenser 19, 23, 90 received therein in the water within the filterwell of the hot tub during the delivery of dispersant into the water within the filterwell. In other cases, the cartridge jacket is not floating during the delivery of dispersant into the water, but rather is retained (e.g., mounted) in a fixed position. In such cases, the cartridge jacket may be rigidly fixed in a stationary position during the delivery of dispersant into the water. As just one example, the cartridge jacket 24 shown in FIG. 8 can optionally be retained (e.g., mounted) in a fixed position during the delivery of dispersant into the water.

Preferably, the cartridge jacket 21, 24, 92 and the cartridge dispenser 19, 23, 90, 190, 290 placed therein are located within a filterwell basket 12 during the delivery of dispersant into the water within the filterwell of the hot tub. Furthermore, the filterwell basket 12 preferably is located in a water circulation system of the hot tub. In such cases, the method preferably includes starting and stopping operation of a water circulation pump of the water circulation system.

As can be appreciated from the present disclosure, the invention provides various embodiments of an apparatus for delivering a dispersant into water within a filterwell of a hot tub. As noted above, the apparatus includes a cartridge dispenser 19, 23, 90, 190, 290, 390, 490 that contains the dispersant and includes one or more ports 23*a* configured to place water within the filterwell of the hot tub in fluid communication with the dispersant contained in the cartridge dispenser. Furthermore, the apparatus preferably is configured to provide a restricted water flow passage 75 alongside the one or more ports 23*a* of the cartridge dispenser 19, 23, 90, 190, 290, 390, 490.

When provided, the restricted flow passage 75 preferably has a gap width of greater than 1/32 inch and less than 1/4 inch, such as greater than 1/32 inch and less than 1/8 inch, e.g., about 1/18-1/14 inch. In one non-limiting example, the gap width of the restricted flow passage 75 is about 1/16 inch.

In some of the present embodiments, the apparatus includes a cartridge jacket 21, 24, 92 and is configured to define the restricted water flow passage 75 between an exterior of the cartridge dispenser 19, 23, 90, 190, 290 and an interior of the cartridge jacket 21, 24, 92. In embodiments of this nature where the apparatus is assembled and positioned operably, the cartridge dispenser 19, 23, 90, 190, 290 is received in the cartridge jacket 21, 24, 92 such that the restricted water flow passage 75 is defined between an exterior of the cartridge dispenser and an interior of the cartridge jacket.

As noted above, the interior of the cartridge jacket 21, 24, 92 can optionally taper from a wider top region to a more narrow bottom region. This is shown, for example, in FIGS. 6 and 8. Furthermore, in some cases, the exterior of the cartridge dispenser 19, 23, 90, 290 tapers from a wider top region to a more narrow bottom region. This is shown in FIG. 6.

More generally, the cartridge dispenser 19, 23, 90, 190, 290, 390, 490 preferably has a generally cylindrical configuration. It may be tapered, or frustoconical, or it may be a regular, non-tapered cylinder. Another possibility is to provide a generally cylindrical configuration with slightly concave shape, such that a middle region of the cartridge dispenser has a smaller diameter than its top and bottom end regions. Various other generally cylindrical configurations can also be used.

In embodiments where the apparatus includes a cartridge jacket 21, 24, 92, the cartridge dispenser 19, 23, 90, 190, 290 can be received in the cartridge jacket, and they both can be located in the water within the filterwell of the hot tub. In such cases, the cartridge jacket 21, 24, 92 and the cartridge dispenser 19, 23, 90, 190, 290 received therein preferably are located within a filterwell basket 12. And the filterwell basket 12 preferably is located in a water circulation system of the hot tub. Moreover, the water circulation system preferably includes a water circulation pump.

As noted above, the restricted water flow passage 75 can optionally be a circumferential fluid chamber that: (i) surrounds an entire circumference of an exterior of the cartridge dispenser, and (ii) extends substantially entirely from a top region of the cartridge dispenser to a bottom region of the cartridge dispenser. Reference is made to the non-limiting examples of FIGS. 6 and 8.

In other embodiments, the restricted water flow passage 75 is internal to the cartridge dispenser 390, 490. Reference is made to the non-limiting examples of FIGS. 10A-11B. Here, the cartridge dispenser 390, 490 includes a base wall 91, the one or more ports 23*a* open through the base wall, and the cartridge dispenser further includes an outer wall 99. When provided, the outer wall 99 is spaced outwardly from the base wall 91, such that the restricted water flow passage 75 is located between the base wall and the outer wall of the cartridge dispenser. In some embodiments of this nature, a single integral body (optionally formed of polymer) defines both the base wall and the outer wall of the cartridge dispenser.

Figure 10A:
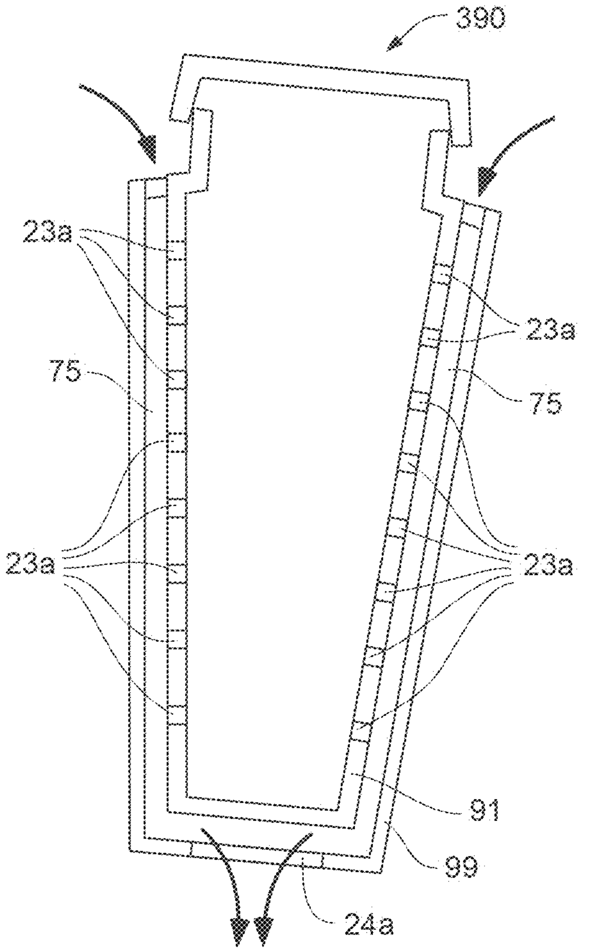
FIG. 10A is a schematic sectional view of a cartridge dispenser having an internal restricted flow passage in accordance with still other embodiments of the invention.
Figure 10B:
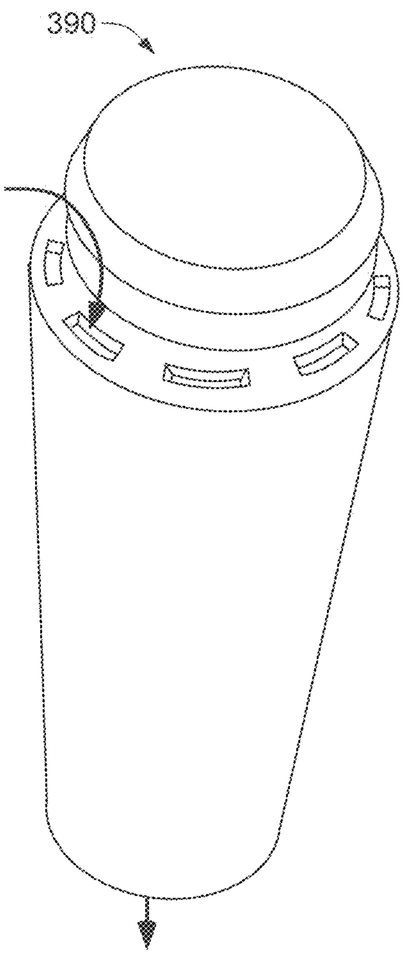
FIG. 10B is a schematic perspective view of the cartridge dispenser of FIG. 10A.

With reference to FIGS. 10A-10B, the base wall 91 and the outer wall 99 of the cartridge dispenser 390 can optionally each have a generally cylindrical configuration. In some cases, the restricted water flow passage 75 is a circumferential fluid chamber surrounding an entire circumference of the base wall 91 of the cartridge dispenser 390. In embodiments of this nature, the apparatus can optionally further include a cartridge jacket, with the cartridge dispenser 390 configured to be received in the cartridge jacket.

Figure 11A:
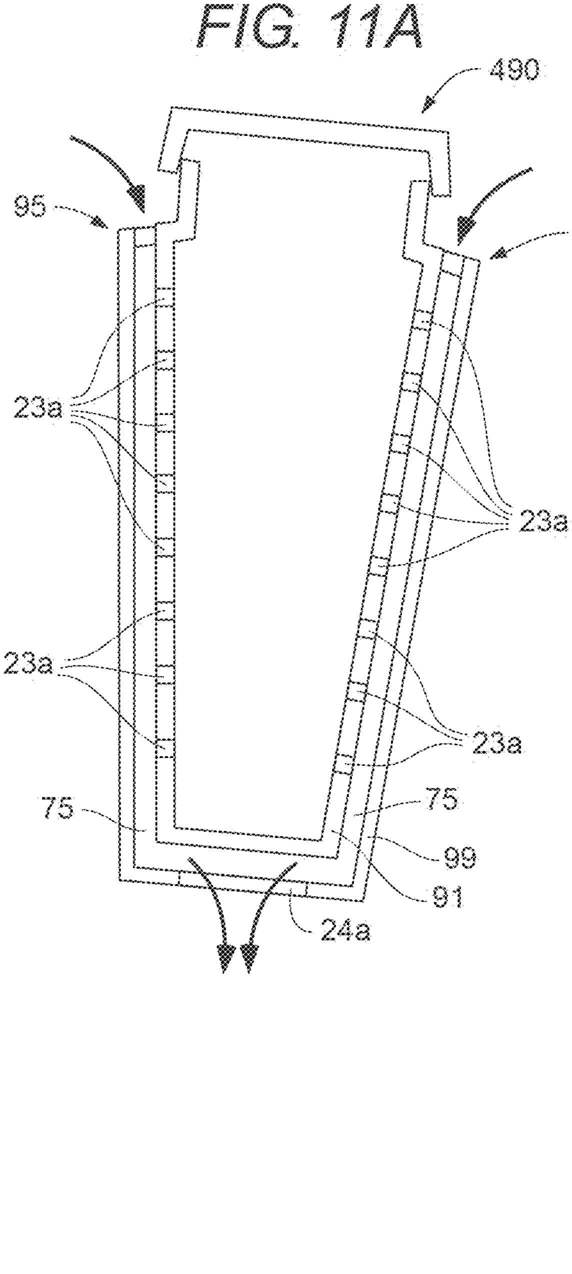
FIG. 11A is a schematic sectional view of another cartridge dispenser having an internal restricted flow passage in accordance with yet other embodiments of the invention.
Figure 11B:
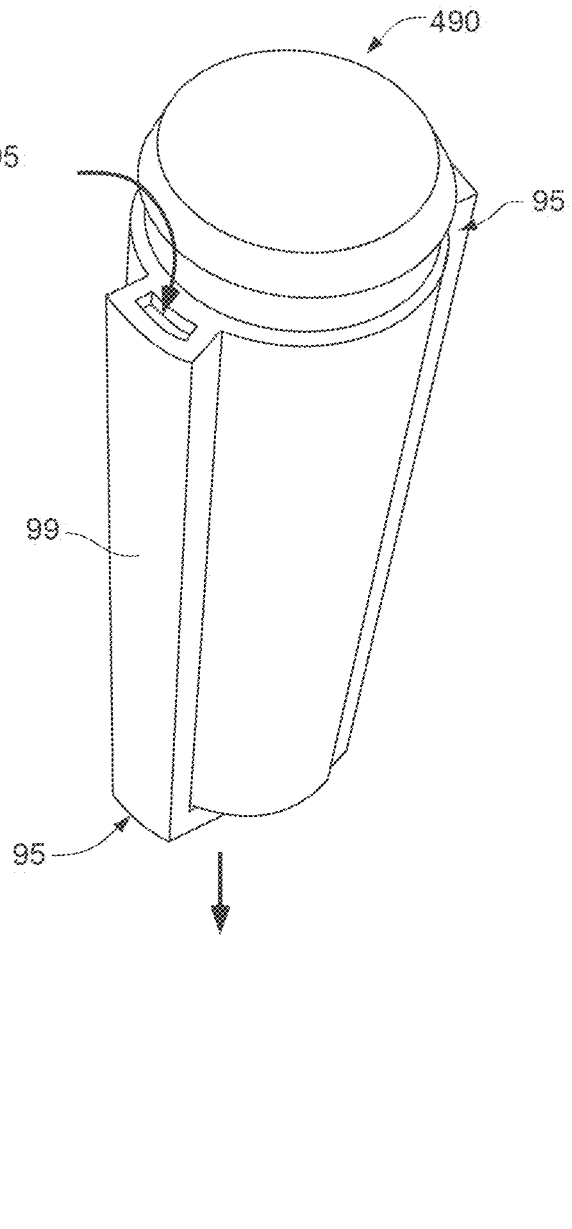
FIG. 11B is a schematic perspective view of the cartridge dispenser of FIG. 11A.

With reference to FIGS. 11A-11B, the cartridge dispenser 490 includes a base wall 91, the one or more ports 23*a* open through the base wall, and the cartridge dispenser further includes a shroud 95. Here, the shroud 95 defines the outer wall 99. In the non-limiting example of FIGS. 11A-11B, the shroud 95 does not span an entire perimeter of the cartridge dispenser 490, but rather is localized adjacent the one or more ports 23*a*. In embodiments of this nature, the shroud 95 is spaced outwardly from the base wall 91 such that the restricted flow passage 75 is located between the base wall and the shroud of the cartridge dispenser. In embodiments of this nature, the apparatus can optionally further include a cartridge jacket, with the cartridge dispenser 490 configured to be received in the cartridge jacket. A single integral body (preferably formed of polymer) can optionally define both the base wall 91 and the shroud 95.

In still other embodiments, the apparatus includes a cartridge jacket 21 configured to receive a cartridge dispenser 290, the cartridge jacket has a shroud 195, and the apparatus is configured to define the restricted water flow passage 75 between the cartridge dispenser and the shroud of the cartridge jacket. Reference is made to the non-limiting example of FIGS. 9A-9B. In the present embodiments, the shroud 195 preferably is not configured to span an entire perimeter of the cartridge dispenser 290 but rather is localized adjacent the one or more ports 23*a* of the cartridge dispenser when the cartridge dispenser is received in the cartridge jacket 21.

With continued reference to the embodiment of FIGS. 9A-9B, the cartridge dispenser 290 preferably has a generally cylindrical configuration. Furthermore, the cartridge dispenser 290 and the cartridge jacket 21 can optionally include one or more keys 277 and keyways 279. In such cases, the one or more keys 277 and keyways 279 preferably are configured to retain the cartridge dispenser 290 in a desired (e.g., predetermined) rotational orientation relative to the cartridge jacket 21 when the cartridge dispenser is received in the cartridge jacket. While not required, the one or more ports 23*a* in these embodiments can optionally include a plurality of spaced-apart ports arranged linearly along a height of the cartridge dispenser 290. In FIGS. 9A and 9B, for example, there are two vertical rows of ports 23*a* on opposite sides of the cartridge dispenser 290. Furthermore, the shroud 195 of the cartridge jacket 21 can be elongated vertically, with the one or more keys 277 and keyways 279 configured such that the shroud of the cartridge jacket is carried alongside the plurality of spaced-apart ports 23*a* when the cartridge dispenser 290 is received in the cartridge jacket.

In one group of method embodiments, the invention provides a method of delivering a dispersant into water within a filterwell of a hot tub, using an apparatus comprising a cartridge dispenser 19, 23, 90. The cartridge dispenser 19, 23, 90 contains the dispersant and includes one or more ports 23*a* that are open to the dispersant contained in the cartridge dispenser. In the present method, the apparatus bounds both a first restricted water flow passage 75 and an open area water flow passage 30. The method includes flowing the water through the apparatus such that: (i) a first amount of the water flows through the first restricted water flow passage 75, thereby placing such water into fluid communication with the dispersant contained in the dispenser cartridge 19, 23, 90 via the one or more ports 23*a*, and (ii) a second amount of the water flows through the open area water flow passage 30. Reference is made to the non-limiting examples of FIGS. 2, 3, 3A, and 7.

Preferably, the first restricted water flow passage 75 and the open area water flow passage 30 form flow paths in parallel, rather than flow paths in series. In more detail, these two flow paths preferably are physically separated from each other. Thus, the second amount of the water preferably does not flow through the first restricted water flow passage 75, and the first amount of the water preferably does not flow through the open area water flow passage 30. Downstream of the apparatus, however, the first and second amounts of the water may be combined into a single flow stream.

The step of flowing the water through the apparatus can optionally involve the second amount of the water flowing through the open area water flow passage 30 while simultaneously the first amount of the water flows through the first restricted water flow passage 75.

Further, the step of flowing the water through the apparatus preferably includes the first amount of the water flowing in a generally downward direction through the first restricted water flow passage 75, and likewise the second amount of the water preferably flows in a generally downward direction through the open area water flow passage 30. In the embodiment of FIGS. 2, 3, and 3A, the apparatus includes an optional weir. In embodiments of this nature, the step of flowing the water through the apparatus can advantageously include the water flowing over and/or through the weir and then downwardly into both the first restricted water flow passage 75 and the open area water flow passage 30.

As can be appreciated from the illustrated flow passage geometries, water flowing through the open area water flow passage 30 (e.g., the second amount of the water) preferably moves at a greater velocity than water flowing through flowing through the first restricted water flow passage 75 (e.g., the first amount of the water).

In the present method embodiments, the step of delivering the dispersant into water within the filterwell of the hot tub preferably is performed for at least two weeks (e.g., at least three weeks, or at least four weeks) before the dispersant contained in the cartridge dispenser 19, 23, 90 is depleted. The two flow passage 30, 75 configurations described and illustrated herein facilitate using cartridge dispensers of the nature described herein to achieve such longevity in delivering the dispersant (e.g., about four weeks before depletion) while also providing a desirable (e.g., effective and safe) amount of dispersant in the water.

As noted above, the first restricted water flow passage 75 can optionally be an annular passage. Additionally or alternatively, the first restricted water flow passage 75 can advantageously have a smaller cross-sectional area than the open area water flow passage 30. This is perhaps best appreciated by referring to FIG. 3 in view of FIGS. 2 and 6.

When provided, the first restricted water flow passage 75 preferably has a gap width of greater than 1/32 inch and less than 1/4 inch, such as greater than 1/32 inch and less than 1/8 inch, e.g., about 1/18-1/14 inch. In one non-limiting example, the gap width of the first restricted flow passage 75 is about 1/16 inch.

In the present embodiments, the apparatus preferably is located within a filterwell basket 12. Furthermore, a sidewall of the filterwell basket 12 can optionally surround both the first restricted water flow passage 75 and the open area water flow passage 30. Reference is made to the non-limiting examples of FIGS. 2, 3, 3A, and 7.

Preferably, the step of flowing the water through the apparatus includes: (i) the first amount of the water flowing through a pervious wall of the filterwell basket 12 after flowing through the first restricted water flow passage 75, and (ii) the second amount of the water flowing through a pervious wall of the filterwell basket 12 after flowing through the open area water flow passage 30. Again, reference is made to FIGS. 2, 3, 3A, and 7. In more detail, the step of flowing the water through the apparatus can optionally include: (i) the first amount of the water flowing through a pervious bottom wall of the filterwell basket 12 immediately after flowing through the first restricted water flow passage 75, and (ii) the second amount of the water flowing through the pervious bottom wall of the filterwell basket 12 immediately after flowing through the open area water flow passage 30.

In the present method embodiments, the apparatus preferably further includes a cartridge jacket 21, 24, 92, and the cartridge dispenser 19, 23, 90 preferably is received in the cartridge jacket such that the first restricted water flow passage 75 is formed between an exterior of the cartridge dispenser and an interior of the cartridge jacket. In some embodiments of this nature, during the delivery of dispersant into the water within the filterwell of the hot tub, the method includes floating the cartridge jacket 21, 24, 92 and the cartridge dispenser 19, 23, 90 received therein in the water within the filterwell of the hot tub. Preferably, during the delivery of dispersant into the water within the filterwell of the hot tub, the cartridge jacket 21, 24, 92 and the cartridge dispenser 19, 23, 90 received therein are located within a filterwell basket 12. Moreover, the filterwell basket 12 preferably is located in a water circulation system of the hot tub, and the method preferably includes starting and stopping operation of a water circulation pump of the water circulation system.

In certain embodiments of the present method, the apparatus further bounds a second restricted water flow passage 75, such that during the step of flowing the water through the apparatus: (i) the first amount of the water flows through the first restricted water flow passage 75, (ii) the second amount of the water flows through the open area water flow passage 30, and (iii) a third amount of the water flows through the second restricted water flow passage 75. This can be appreciated, for example, by referring to FIGS. 2, 3, and 3A in view of FIG. 6. When provided, the second restricted water flow passage 75 can optionally have the same gap width dimensions and general configuration as the first restricted water flow passage 75. Preferably, the water flowing through the open area water flow passage 30 (e.g., the second amount of the water) moves at a velocity greater than that of the water flowing through the first restricted water flow passage 75 (e.g., the first amount of the water) and greater than that of the water flowing through the second restricted water flow passage 75 (e.g., the third amount of the water). Additionally or alternatively, the second amount of the water can optionally be greater than a total of both the first amount of the water and the third amount of the water.

In certain embodiments, the open area water flow passage 30 is located between first and second restricted water flow passages 75. Reference is made to FIGS. 2, 3, and 3A. Here, the first restricted water flow passage 75 is an annular passage, and the second restricted water flow passage 75 is an annular passage. It is to be appreciated, however, that many other configurations can be used for the noted flow passages. Some other examples involve the open area water flow passage being divided into two or more open area water flow passages, or otherwise providing two or more open area water flow passages. In such examples, there can be two or more non-restricted water flow paths in addition to one or more restricted water flow passages. Additionally or alternatively, in embodiments where there are two or more restricted water flow passages 75, it may be an option to have at least one of the restricted water flow passages not be configured and/or used for dispersant delivery.

In one group of apparatus embodiments, the invention provides an apparatus for delivering a dispersant into water within a filterwell of a hot tub. The apparatus includes a cartridge dispenser 19, 23, 90 that contains the dispersant and includes one or more ports 23*a* configured to place water within the filterwell of the hot tub in fluid communication with the dispersant contained in the cartridge dispenser. In the present embodiments, the apparatus is configured to bound: (i) an open area water flow passage 30, and (ii) a first restricted water flow passage 70 alongside the one or more ports 23*a*. Reference is made to the non-limiting examples of FIGS. 2, 3, 3A, and 7.

As noted above, the apparatus preferably is configured such that the first restricted water flow passage 75 and the open area water flow passage 30 are flow paths in parallel, rather than flow paths in series. And these two flow paths preferably are physically separated from each other. Downstream of the apparatus, however, these two flow paths preferably open into (e.g., merge into) a single flow path.

The first restricted water flow passage 75 can optionally be an annular passage. Additionally or alternatively, the first restricted water flow passage 75 can advantageously have a smaller cross-sectional area than the open area water flow passage 30. This is perhaps best appreciated by referring to FIG. 3 in view of FIGS. 2 and 6.

In the present apparatus embodiments, the first restricted water flow passage 75 can have a gap width within any one or more of the ranges noted above (e.g., greater than 1⁄32 inch and less than 1⁄8 inch).

Preferably, the apparatus is configured to be mounted operatively within a filterwell basket 12. In some cases, for example, the apparatus is configured to be mounted operatively within a filterwell basket 12 such that a sidewall of the filterwell basket surrounds both the first restricted water flow passage 75 and the open area water flow passage 30. Reference is made to the non-limiting examples of FIGS. 2, 3, 3A, and 7.

In the present apparatus embodiments, the apparatus preferably further includes a cartridge jacket 21, 24, 92, and the cartridge dispenser 19, 23, 90 preferably is configured to be received in the cartridge jacket such that the first restricted water flow passage 75 is formed between an exterior of the cartridge dispenser and an interior of the cartridge jacket. In embodiments of this nature where the apparatus is assembled and positioned operably, the cartridge dispenser 19, 23, 90 is received in the cartridge jacket 21, 24, 92 such that the first restricted water flow passage 75 is formed between an exterior of the cartridge dispenser and an interior of the cartridge jacket. In certain embodiments of this nature, the cartridge jacket 21, 24, 92 and the cartridge dispenser 19, 23, 90 received therein are floating in the water within the filterwell of the hot tub. Preferably, the cartridge jacket 21, 24, 92 and the cartridge dispenser 19, 23, 90 received therein are located within a filterwell basket 12. Moreover, the filterwell basket 12 preferably is located in a water circulation system of the hot tub, with the water circulation system including a water circulation pump.

In some of the present apparatus embodiments, the apparatus further bounds a second restricted water flow passage 75. This can be appreciated, for example, by referring to FIGS. 2, 3, and 3A in view of FIG. 6. When provided, the second restricted water flow passage 75 can optionally have the same gap width dimensions and general configuration as the first restricted water flow passage 75. In certain embodiments, the open area water flow passage 30 is located between first and second restricted water flow passages 75. Reference is made to FIGS. 2, 3, and 3A. Here, the first restricted water flow passage 75 is an annular passage, and the second restricted water flow passage 75 is an annular passage. It is to be appreciated, however, that many other configurations can be used for the noted flow passages. Additionally or alternatively, the open area water flow passage 30 can optionally have a cross-sectional area that is greater than the combined cross-sectional area of both the first and second restricted water flow passages 75.

While some preferred embodiments of the invention have been described, it should be understood that various changes, adaptations and modifications may be made therein without departing from the spirit of the invention and the scope of the appended claims.

What is claimed is:

1. A method of delivering a dispersant into water within a filterwell of a hot tub, the method comprising providing a cartridge dispenser containing the dispersant, the cartridge dispenser having a generally cylindrical configuration, and the cartridge dispenser including one or more ports configured to place water within the filterwell in fluid communication with the dispersant contained in the cartridge dispenser, wherein the method includes placing the cartridge dispenser in a cartridge jacket such that a restricted flow passage is formed between an exterior of the cartridge dispenser and an interior of the cartridge jacket, the restricted flow passage located alongside the one or more ports whereby water in the restricted flow passage is in fluid communication with the dispersant in the cartridge dispenser via the one or more ports, and such that the cartridge jacket and the cartridge dispenser therein are located within a filterwell basket, the filterwell basket having a porous grid sidewall and a porous grid bottom wall, wherein during said delivering the dispersant into water within the filterwell of the hot tub the method comprises floating the cartridge jacket and the cartridge dispenser received therein in the water within the filterwell of the hot tub, and the method comprises flowing water within the filterwell of the hot tub downwardly into the restricted flow passage and through the restricted flow passage in a generally downward direction.

2. The method of claim 1 wherein a gap width of the restricted flow passage is greater than 1/32 inch and less than 1/8 inch.

3. The method of claim 2 wherein the gap width of the restricted flow passage is about 1/18-1/14 inch.

4. The method of claim 1 wherein the restricted flow passage is an annular passage.

5. The method of claim 1 wherein the filterwell basket is located in a water circulation system of the hot tub, and the method includes starting and stopping operation of a water circulation pump of the water circulation system.

6. The method of claim 1 wherein the restricted flow passage is a circumferential fluid chamber that: (i) surrounds an entire circumference of the exterior of the cartridge dispenser, and (ii) extends substantially entirely from a top region of the cartridge dispenser to a bottom region of the cartridge dispenser.

7. The method of claim 1 wherein the interior of the cartridge jacket tapers from a wider top region to a more narrow bottom region.

8. The method of claim 7 wherein the exterior of the cartridge dispenser tapers from a wider top region to a more narrow bottom region.

9. The method of claim 7 wherein a gap width of the restricted flow passage is greater adjacent a top region of the cartridge dispenser than it is adjacent a bottom region of the cartridge dispenser.

10. The method of claim 1 wherein said delivering the dispersant into water within the filterwell of the hot tub is performed for at least three weeks before the dispersant contained in the cartridge dispenser is depleted.

11. The method of claim 1 wherein the dispersant contained in the cartridge dispenser comprises zinc, malic acid, or both.

12. The method of claim 1 wherein the cartridge jacket is part of a weir comprising one or more trapped air floats, and wherein said floating the cartridge jacket and the cartridge dispenser received therein in the water within the filterwell of the hot tub is done by virtue of the one or more trapped air floats.

13. The method of claim 1 wherein the cartridge jacket is part of a weir that includes two followers respectively engaging two guide slots on diagonally opposite sides of the filterwell basket, each of the two guide slots having a vertical extent allowing the weir to move upwardly and downwardly as the weir floats in the water within the filterwell of the hot tub.

14. The method of claim 13 wherein the two guide slots are respectively separated by two physical barriers from two corresponding upper slots, the two physical barriers being two web portions of the sidewall of the filterwell basket, and the method further includes removing the weir from the filterwell basket by lifting the weir out of the filterwell basket, whereby the two followers respectively bear outwardly on the two web portions to outwardly flex the two web portions while the two followers are forced upwardly past the two web portions and into the two upper slots.

15. The method of claim 13 wherein each of the two followers is a retention tab having a ramped upper portion and a ramped lower portion.

16. The method of claim 1 wherein the cartridge jacket has a water inlet at a top end of the cartridge jacket, such that said flowing water within the filterwell of the hot tub downwardly into the restricted flow passage comprises flowing such water into the water inlet at the top end of the cartridge jacket.

17. The method of claim 16 wherein the water inlet of the cartridge jacket is located within a split collar of the cartridge jacket, the split collar extending above a water line during said floating the cartridge jacket and the cartridge dispenser received therein in the water within the filterwell of the hot tub.

18. The method of claim 17 wherein the split collar of the cartridge jacket has gaps therein that provide paths for water entry into the cartridge jacket while the split collar is extending above the water line during said floating the cartridge jacket and the cartridge dispenser received therein in the water within the filterwell of the hot tub.

19. The method of claim 17 wherein the split collar of the cartridge jacket has gaps therein, and a top end of the cartridge dispenser is located within the split collar, wherein the method further includes grasping, through the gaps in the split collar, the top end of the cartridge dispenser and removing the cartridge dispenser from the cartridge jacket.

20. The method of claim 8 wherein a gap width of the restricted flow passage is substantially the same at all locations of the restricted flow passage.

* * * * *